US009450817B1

(12) United States Patent
Bahadur et al.

(10) Patent No.: US 9,450,817 B1
(45) Date of Patent: Sep. 20, 2016

(54) SOFTWARE DEFINED NETWORK CONTROLLER

(71) Applicant: Juniper Networks, Inc., Sunnyvale, CA (US)

(72) Inventors: Nitin Bahadur, Santa Clara, CA (US); Kenneth E. Gray, Myersville, MD (US)

(73) Assignee: Juniper Networks, Inc., Sunnyvale, CA (US)

(*) Notice: Subject to any disclaimer, the term of this patent is extended or adjusted under 35 U.S.C. 154(b) by 207 days.

(21) Appl. No.: 14/042,614

(22) Filed: Sep. 30, 2013

Related U.S. Application Data

(60) Provisional application No. 61/799,922, filed on Mar. 15, 2013.

(51) Int. Cl.
*G06F 15/177* (2006.01)
*H04L 12/24* (2006.01)
*H04L 12/725* (2013.01)

(52) U.S. Cl.
CPC ........... *H04L 41/0813* (2013.01); *H04L 45/30* (2013.01)

(58) Field of Classification Search
CPC ........... H04L 12/4633; H04L 41/0823; H04L 45/64; H04L 47/12; H04L 41/12; H04L 45/30; H04L 45/50; H04N 7/17309
USPC ........ 709/223, 224; 370/235, 254, 255, 392; 725/98
See application file for complete search history.

(56) References Cited

U.S. PATENT DOCUMENTS

| | | | |
|---|---|---|---|
| 8,422,360 B2 | 4/2013 | Shimizu et al. | |
| 8,483,123 B2 | 7/2013 | Zheng et al. | |
| 2003/0103510 A1 | 6/2003 | Svanberg et al. | |
| 2005/0169313 A1 | 8/2005 | Okamura et al. | |
| 2007/0165515 A1 | 7/2007 | Vasseur | |
| 2008/0037562 A1 | 2/2008 | Saleh et al. | |
| 2008/0201748 A1* | 8/2008 | Hasek ................ | H04N 7/17309 725/98 |
| 2009/0122718 A1 | 5/2009 | Klessig et al. | |
| 2009/0232031 A1 | 9/2009 | Vasseur et al. | |
| 2009/0238074 A1 | 9/2009 | Vasseur et al. | |
| 2011/0044352 A1 | 2/2011 | Chaitou et al. | |
| 2011/0047262 A1 | 2/2011 | Martin et al. | |
| 2011/0078230 A1 | 3/2011 | Sepulveda | |
| 2011/0110226 A1 | 5/2011 | Lu et al. | |
| 2011/0110368 A1 | 5/2011 | Matsumoto | |
| 2011/0202651 A1 | 8/2011 | Hilt et al. | |
| 2012/0092986 A1 | 4/2012 | Chen | |

(Continued)

OTHER PUBLICATIONS

Response to the Office Action mailed Mar. 11, 2015, from U.S. Appl. No. 14/336,535, filed Jun. 11, 2015, 13 pp.

(Continued)

*Primary Examiner* — Dustin Nguyen
(74) *Attorney, Agent, or Firm* — Shumaker & Sieffert, P.A.

(57) ABSTRACT

An extensible software defined network (SDN) controller is described that provides an application-aware framework that enable a variety of different user applications to communicate with the controller and that allows the controller to automatically configure devices in a network based on the needs of the applications. For example, the controller includes a plurality of different northbound interfaces that enable a variety of different user applications to communicate with the controller. The controller also includes multiple southbound protocols for configuring and enabling functionality in network devices based on the communications with the user applications.

25 Claims, 8 Drawing Sheets

(56) References Cited

U.S. PATENT DOCUMENTS

| | | | | |
|---|---|---|---|---|
| 2012/0158938 | A1 | 6/2012 | Shimonishi et al. | |
| 2013/0007266 | A1 | 1/2013 | Jocha et al. | |
| 2013/0060929 | A1* | 3/2013 | Koponen | H04L 12/4633 709/224 |
| 2013/0070638 | A1 | 3/2013 | Iovanna et al. | |
| 2013/0329601 | A1* | 12/2013 | Yin | H04L 41/0823 370/254 |
| 2013/0336159 | A1* | 12/2013 | Previdi | H04L 45/50 370/254 |
| 2014/0098710 | A1* | 4/2014 | Ong | H04L 41/12 370/255 |
| 2014/0122683 | A1* | 5/2014 | Zhao | H04L 45/64 709/223 |
| 2014/0192645 | A1* | 7/2014 | Zhang | H04L 47/12 370/235 |
| 2014/0269724 | A1* | 9/2014 | Mehler | H04L 45/30 370/392 |
| 2014/0328587 | A1 | 11/2014 | Magri et al. | |

OTHER PUBLICATIONS

Notice of Allowance from U.S. Appl. No. 13/339,983, dated Mar. 18, 2014, 9 pp.

Office Action from U.S. Appl. No. 14/336,535, dated Mar. 11, 2015, 13 pp.

Response to Office Action from U.S. Appl. No. 13/339,983 dated Nov. 19, 2013, filed Jan. 21, 2014, 24 pp.

Supplemental Response to Office Action from U.S. Appl. No. 13/339,983 dated Nov. 19, 2013, filed Feb. 10, 2014, 17 pp.

Notice of Allowance from U.S. Appl. No. 13/339,983 dated Mar. 18, 2014, 9 pp.

Office Action from U.S. Appl. No. 13/339,983 dated Nov. 19, 2013, 27 pp.

Office Action from U.S. Appl. No. 14/336,535, dated Oct. 5, 2015, 10 pp.

Office Action from U.S. Appl. No. 14/336,535, dated Mar. 10, 2016, 14 pp.

Amendment in Response to Office Action mailed Oct. 5, 2015, from U.S. Appl. No. 14/336,535, filed Jan. 5, 2016, 11 pp.

Crabbe et al., "PCEP Extensions for Stateful PCE," Network Working Group Internet Draft, draft-crabbe-pce-stateful-pce-00, Oct. 16, 2011, 40 pp.

Farrel et al., "A Path Computation Element (PCE)-Based Architecture," RFC 4655, Aug. 2006, 41 pp.

Ash et al., "Path Computation Element (PCE) Communication Protocol Generic Requirements," RFC 4657, Sep. 2006, 22 pp.

Vasseur et al., "Path Computation Element (PCE) Communication Protocol (PCEP)," RFC 5440, Mar. 2009, 88 pp.

Lee et al., "Path Computation Element Communication Protocol (PCEP) Requirements and Protocol Extensions in Support of Global Concurrent Optimization," RFC 5557, Jul. 2009, 27 pp.

U.S. Appl. No. 13/110,987, by Jan Medved, filed May 19, 2011.

U.S. Appl. No. 12/182,619, by Jerome P. Moisand, filed Jul. 30, 2008.

Sahni et al., "Bandwidth Scheduling and Path Computation Algorithms for Connection-Oriented Networks," Sixth International Conference on Networking, Apr. 22-28, 2007, 16 pp.

OpenFlow Switch Specification, Version 1.1.0, Openflow Consortium, Feb. 28, 2011, found at http://www.openflow.org/documents/openflow-spec-v1.1.0.pdf, 56 pp.

McKeown et al., "Open Flow: Enabling Innovation in Campus Networks," Whitepaper from Stanford University, Mar. 14, 2008, 6 pp.

Seedorf et al., "Application-Layer Traffic Optimization (ALTO) Problem Statement," RFC 5693, Oct. 2009, 15 pp.

Alimi et al., "ALTO Protocol," draft-ietf-alto-protocol-06.txt, ALTO WG Internet-Draft, Oct. 25, 2010, 66 pp.

U.S. Appl. No. 12/861,645, by Jan Medved, filed Aug. 23, 2010.

U.S. Appl. No. 12/861,681, by Satish Raghunath, filed Aug. 23, 2010.

Bryant et al., "Pseudo Wire Emulation Edge-to-Edge (PWE3) Architecture," RFC 3985, Mar. 2005, 40 pp.

Miyazawa et al., "Traffic Engineering Database Management Information Base in support of MPLS-TE/GMPLS," Internet Draft, draft-ieff-ccamp-gmpls-ted-mib-09.txt, Jul. 11, 2011, 33 pp.

Oki et al., "Framework for PCE-Based Inter-Layer MPLS and GMPLS Traffic Engineering," RFC 5623, Sep. 2009, 35 pp.

Bryskin et al., Policy-Enabled Path Computation Framework, RFC 5394, Dec. 2008, 37 pp.

Chamania et al., "Lessons Learned From Implementing a Path Computation Element (PCE) Emulator," Optical Fiber Communication and Exposition, Mar. 6-10, 2011, 3 pp.

U.S. Appl. No. 13/324,861, by Jan Medved, filed Dec. 13, 2011.

U.S. Appl. No. 13/340,191, by Jan Medved, filed Dec. 29, 2011.

U.S. Appl. No. 13/339,983, by Jan Medved, filed Dec. 29, 2011.

U.S. Appl. No. 13/724,975, by Santosh Kumar Domal, filed Dec. 21, 2012.

U.S. Appl. No. 13/842,453, by James Michael Murphy, filed Mar. 15, 2013.

Atlas et al., "Interface to the Routing System Framework," draft-ward-irs-framework-00, Network Working Group, Internet-Draft, Jul. 30, 2012, 21 pp.

Response to Office Action mailed Mar. 10, 2016, from U.S. Appl. No. 14/336,535, filed Jun. 10, 2016, 12 pp.

* cited by examiner 302
305
CLIENT 318A
CLIENT 318N
MULTI-TOPOLOGY PATH COMPUTATION ELEMENT 308
TOPOLOGY SERVER 304
OVERLAY CONTROLLER 314
322
324
326
328
330
303
NETWORK SWITCH 306A
NETWORK SWITCH 306B
OVERLAY SWITCH 312A
OVERLAY SWITCH 312B
HOST 313A
HOST 313B
HOST 313C

SOFTWARE DEFINED NETWORK CONTROLLER

This application claims the benefit of U.S. Provisional Application No. 61/799,922, filed Mar. 15, 2013, the entire content of which is incorporated by reference herein.

TECHNICAL FIELD

The invention relates to computer networks and, more specifically, to improving content delivery.

BACKGROUND

Large-scale applications geographically distributed over large areas often process large distributed datasets that require massive data transfer over a wide area network. Service provider networks typically provide an extensive network infrastructure to provide packet-based data services to the offered services. The network infrastructure typically includes a vast collection of access nodes, aggregation nodes and high-speed edge routers interconnected by communication links. These access devices typically execute various protocols and exchange signaling messages to anchor and manage subscriber sessions and communication flows associated with the subscribers.

SUMMARY

In general, an extensible software defined network (SDN) controller is described that provides an application-aware framework that enables a variety of different user applications to communicate with the controller and that allows the controller to automatically configure devices in a network based on the needs of the applications. For example, the controller includes a plurality of different "northbound interfaces" that enable a variety of different user applications to communicate with the controller. The controller also includes a plurality of "southbound interface" by which the controller receives topology information from deployed switching and routing infrastructure and that allows various southbound protocols to configure and enable functionality in network devices based on the communications with the user applications.

In example implementations, the techniques of this disclosure provide an SDN controller that ties together service modules with standard southbound Application Programming Interfaces (APIs) and protocols that provide services such as policy, service discovery/registration, stateful topology management, path computation and provisioning using a plug-in architecture. The SDN controller provides a set of northbound APIs for application development that can be used in both workflow and service creation applications as well as end-user client applications.

Some examples of the SDN controller described herein may include domain-wide network platforms with multiple programmable APIs including both OpenFlow and Path Computation Element (PCE), and may leverage and interoperate with existing distributed networking control planes in a hybrid model. This enables the seamless implementation of SDN and the realization of its benefits at performance and scale, without breaking anything in the networking environment.

In some example implementations, the SDN controller provides a mechanism for bridging the application-to-network divide, allowing an application to signal requirements to the network, and the network can be dynamically programmed to support the applications requirements. The SDN controller can greatly simplify the provisioning of complex network capabilities while enabling application and service innovation with predictable performance and better experiences without impacting operations.

The techniques of this disclosure may provide one or more advantages. For example, the SDN controller improves operational efficiency, as the network is automatically provisioned with no need for human intervention. The SDN controller can also provide greater service agility, as networks can be dynamically morphed to support new applications experiences. The SDN controller can also provide capital efficiency, i.e., an ability to do more with less, because networks do not need to be over-built or purpose built for a particular service or application. Rather, network resources can be allocated only when needed and reserved for high priority applications and business critical applications.

In some examples, a controller that manages a network of one or more network devices comprises one or more databases configured to store network topology information and network state information for the network devices. The controller also comprises one or more network device protocol interfaces, wherein each of the network device protocol interfaces is configured to exchange state information with at least one of the network devices, wherein the state information comprises at least one of network topology information and network device state information. The controller also comprises one or more application interfaces configured to receive, from applications, requests for application-specific network configurations. The controller also comprises one or more core modules configured to compute respective network configurations to conform the network topology and network device states to satisfy the requests. The controller also comprises one or more core applications configured to generate network device state information to implement computed network configurations and to use the network device protocol interfaces to program the network device state information to the network devices to program the network configuration in the network.

In another example, a method comprises storing, by one or more databases of a controller that manages a network of one or more network devices, network topology information and network state information for the network devices. The method also comprises exchanging, with at least one of the network devices and by one or more network device protocol interfaces of the controller, state information comprising at least one of network topology information and network device state information. The method also comprises receiving, by one or more application interfaces of the controller and from applications, requests for application-specific network configurations. The method also comprises computing, by one or more core modules of the controller, respective network configurations to conform the network topology and network device states to satisfy the requests. The method also comprises generating, by one or more core applications of the controller, network device state information to implement computed network configurations and to use the network device protocol interfaces to program the network device state information to the network devices to program the network configuration in the network.

This disclosure also describes devices, computing devices, apparatuses, and computer-readable mediums storing instructions that may be configured to perform the techniques described herein.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like reference characters denote like elements throughout the figures and text.

DETAILED DESCRIPTION

Figure 1:
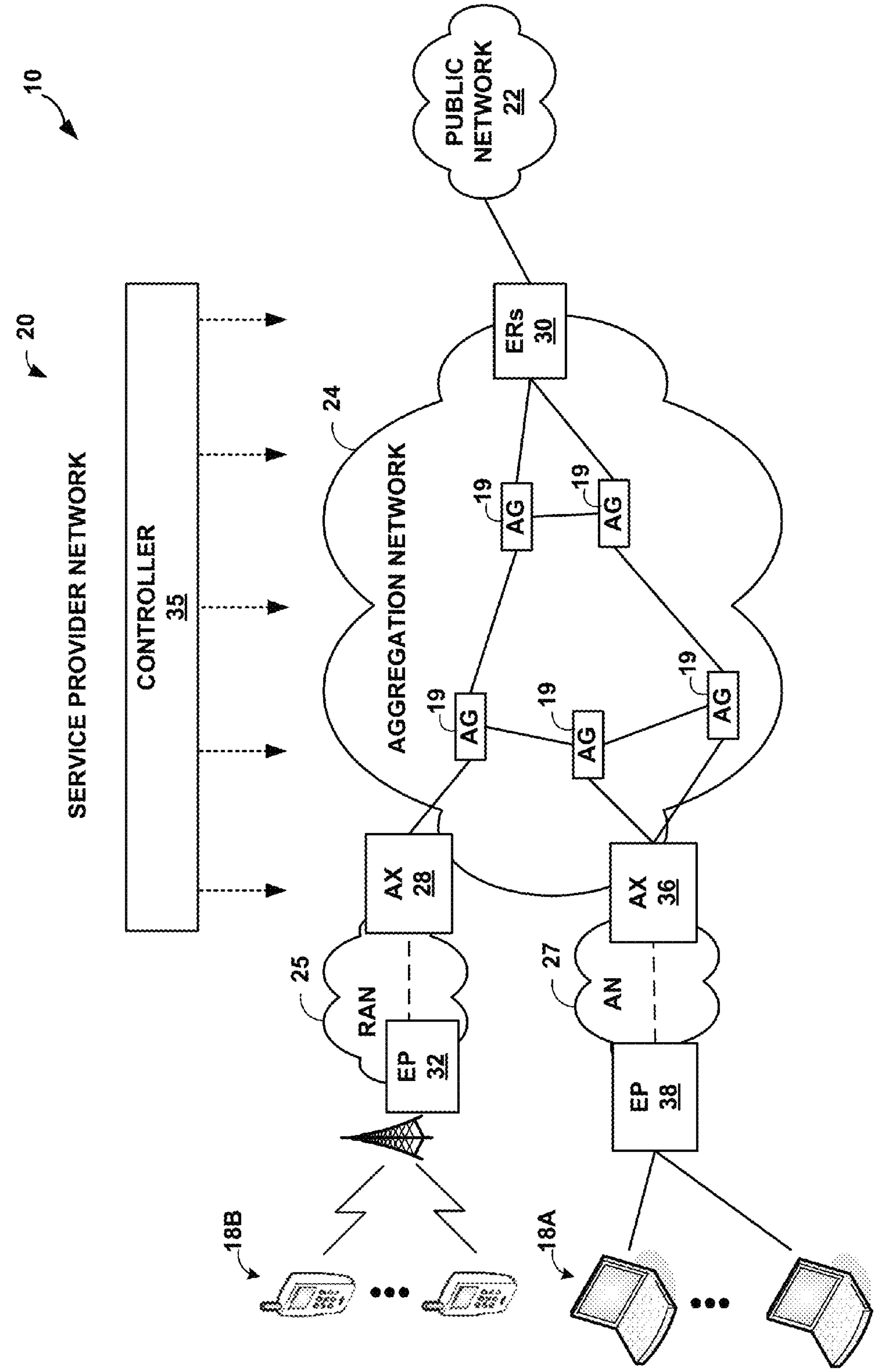
FIG. 1 is a block diagram illustrating an example network system in accordance with techniques described herein.

FIG. 1 is a block diagram illustrating an example network system 10 in accordance with techniques described herein. As shown in the example of FIG. 1, network system 10 includes a service provider network 20 coupled to a public network 22. Service provider network 20 operates as a private network that provides packet-based network services to subscriber devices 18A, 18B (herein, "subscriber devices 18"). Subscriber devices 18A may be, for example, personal computers, laptop computers or other types of computing device associated with subscribers. Subscriber devices 18 may comprise, for example, mobile telephones, laptop or desktop computers having, e.g., a 3G wireless card, wireless-capable netbooks, video game devices, pagers, smart phones, personal data assistants (PDAs) or the like. Each of subscriber devices 18 may run a variety of software applications, such as word processing and other office support software, web browsing software, software to support voice calls, video games, videoconferencing, and email, among others.

In the example of FIG. 1, service provider network 20 includes a centralized controller 35 that orchestrates various end-to-end solutions across various network devices of FIG. 1. As described in further detail below, the SDN controller 35 delivers a feedback loop mechanism between the network and client applications in both directions. Via controller 35, applications can inform devices in service provider network 20 of certain requested aspects such as service-level agreements (SLAs) or guarantees. The SDN controller 35 brings the application and service provider network 20 together so that service provider network 20 can adapt to the needs of the applications, and so that the applications can adapt to the changing service provider network 20. In this manner, controller 35 provides a mechanism for real-time application-to-network collaboration.

Aggregation network 24 provides transport services for network traffic associated with subscribers 18. Aggregation network 24 typically includes one or more aggregation nodes ("AG") 19, such as internal routers and switches that provide transport services between access nodes (AXs) 28, 36 and edge routers (ERs) 30. Aggregation nodes 19 are nodes which aggregate several access nodes 28, 36. After authentication and establishment of network access through access network 27 or radio access network 25, any one of subscriber devices 18 may begin exchanging data packets with public network 22 with such packets traversing AXs 28, 36 and AGs 19. Although not shown, aggregation network may include other devices to provide security services, load balancing, billing, deep-packet inspection (DPI), and other services for mobile traffic traversing aggregation network 24.

As described herein, controller 25 operates to provide a central configuration point for configuring AGs 19 of aggregation network 24 provide transport services to transport traffic between AXs 28, 36 and edge routers 30. AGs 19 may, for example, operate as label switched routers (LSRs) that forward traffic along transport label switched paths (LSPs) defined within aggregation network 24. Access nodes 28, 36 and edge routers 30 may operate as endpoints for the LSPs to map subscriber traffic into and out of the LSPs. For example, edge routers 30 may map network services to individual LSPs within aggregation network 24, while access nodes 28, 36 map the network services to individual end points (EPs) 32, 38 via the LSPs. Controller 35 traffic engineers the LSPs through aggregation network 24 according to the bandwidth, Quality of Service (QoS) and availability requirements of network services applications, as further described below.

As further described below, controller 35 includes a path computation module (PCM) that handles topology computation and path provisioning for the whole of aggregation network 24. That is, the PCM of controller 35 processes topology information for aggregation network 24, performs path computation and selection in real-time based on a variety of factors, including current load conditions of subscriber traffic, and provisions the LSPs within the aggregation network.

AXs 28, 36 and ERs 30 operate at the borders of aggregation network 24 and, responsive to controller 35, apply network services, such as authorization, policy provisioning and network connectivity, to network traffic associated with subscribers 18 in communication with access nodes 28, 36. In the example of FIG. 1, for ease of explanation, service provider network 20 is shown having two access nodes 28, 36, although the service provider network may typically service thousands or tens of thousands of access nodes.

In this example, service provider network includes an access network 27 with an AX 36 and EP 38 that provide subscriber devices 18A with access to aggregation network 24. In some examples, AX 36 may comprise a router that maintains routing information between subscriber devices 18A and aggregation network 24. AX 36, for example, typically includes Broadband Remote Access Server (BRAS) functionality to aggregate output from one or more EPs 38 into a higher-speed uplink to aggregation network 24. Edge router 30 provides an anchor point of active sessions for subscriber devices 18A. In this sense, edge router 30 may maintain session data and operate as a termination point for communication sessions established with subscriber devices 18A that are currently accessing packet-based services of public network 22 via aggregation network 24.

EP 38 may communicate with AX 36 over a physical interface supporting various protocols. EP 38 may comprise a switch, a router, a gateway, or another terminal that operates as a demarcation point between customer equipment, such as subscriber devices 18B, and service provider equipment. In one example, EP 38 may comprise a digital subscriber line access multiplexer (DSLAM) or other switching device. Each of subscriber devices 18A may utilize a Point-to-Point Protocol (PPP), such as PPP over Asynchronous Transfer Mode (ATM) or PPP over Ethernet (PPPoE), to communicate with EP 38. For example, using PPP, one of subscriber devices 18 may request access to aggregation network 24 and provide login information, such as a username and password, for authentication by policy server (not shown). Other embodiments may use other lines besides DSL lines, such as cable, Ethernet over a T1, T3 or other access links.

As shown in FIG. 1, service provider network 20 may include a radio access network 25 with an access node (AX) 28 and EP 32 that provide subscriber devices 18B with access to aggregation network 24 via radio signals. For example, EP 32 may be connected to one or more wireless radios or base stations (not shown) to wirelessly exchange packetized data with subscriber devices 18B. EP 32 may comprise a switch, a router, a gateway, or another terminal that aggregates the packetized data received from the wireless radios to AX 28. The packetized data may then be communicated through aggregation network 24 of the service provider by way of AGs 19 and edge routers (ERs) 30, and ultimately to public network 22.

Aggregation network 24 provides session management, mobility management, and transport services to support access, by subscriber devices 18B, to public network 22. Edge router 30 provides an anchor point of active sessions for subscriber devices 18B. Edge router 30 may maintain session data and operate as a termination point for communication sessions established with subscriber devices 18B that are currently accessing packet-based services of public network 22 via aggregation network 24.

In some examples, one or more of access network 27 and radio access network 25 may comprise an optical access network. For example, AX 36 may comprise an optical line terminal (OLT) connected to one or more EPs or optical network units (ONUs) via optical fiber cables. In this case, AX 36 may convert electrical signals from aggregation network 24 to optical signals using an optical emitter, i.e., a laser, and a modulator. AX 36 then transmits the modulated optical signals over one or more optical fiber cables to the CPEs, which act as termination points of the optical access network. As one example, EP 38 converts modulated optical signals received from AX 36 to electrical signals for transmission to subscriber devices 18A over copper cables. As one example, EP 38 may comprise a switch located in a neighborhood or an office or apartment complex capable of providing access to a plurality of subscriber devices 18A. In other examples, such as fiber-to-the-home (FTTH), EP 38 may comprise a gateway located directly at a single-family premise or at an individual business capable of providing access to the one or more subscriber devices 18A at the premise. In the case of radio access network 25, the EPs may be connected to wireless radios or base stations and convert the modulated optical signals to electrical signals for transmission to subscriber devices 18B via wireless signals.

Controller 35 is an SDN controller that consists of several main logical pieces: 1) South-bound protocols for configuring and enabling functionality in network devices, 2) A topology manager that maintains the topology, 3) Core modules/plugins (like Traffic engineering database, Path computation engine) that enable applications, 4) Core applications that use the protocols to provide functionality (like PCE server and OpenFlow controller), 5) User-oriented applications that solve end to end use-cases, and 6) North-bound interfaces that enable users/user-apps to talk to the Controller 35.

Modules of controller 35 can communicate using open interfaces, so that each module can be independently replaced to serve a special-purpose application or network orchestration need. Controller 35 is configured such that new modules can be added at various layers (like application layer) while re-using the functionality provided by modules at other layers. Controller 35 can communicate with other controllers at the network layer and/or the application layer to carry out the desired user functionality.

Some examples of applications that controller 35 can interface with that solve end to end use-cases include Connectivity on-demand, Firewall in-cloud, video on demand, data replication, automatic service creation (e.g., for mobile), and the like. By having a modular design, the techniques of this disclosure can provide incremental value-added services on an extensible controller 35. The plugin model allows for a third party plugins (like a different path computation engine) to be plugged into controller 35 to provide differentiated services. An example of this would be the Topology service, where static network topology file or an active topology feed using Border Gateway Protocol Traffic Engineering (BGP-TE) are allowed. The techniques of this disclosure enable the plugins and controller apps to provide RESTful APIs to application programmers. An example would be an Application-Layer Traffic Optimization (ALTO) engine would use the topology service and provide a RESTFul interface to the ALTO clients. A RESTful web service (also called a RESTful web API) is a web service implemented using Hypertext Transfer Protocol (HTTP) and the principles of Representational State Transfer (REST).

Figure 2:
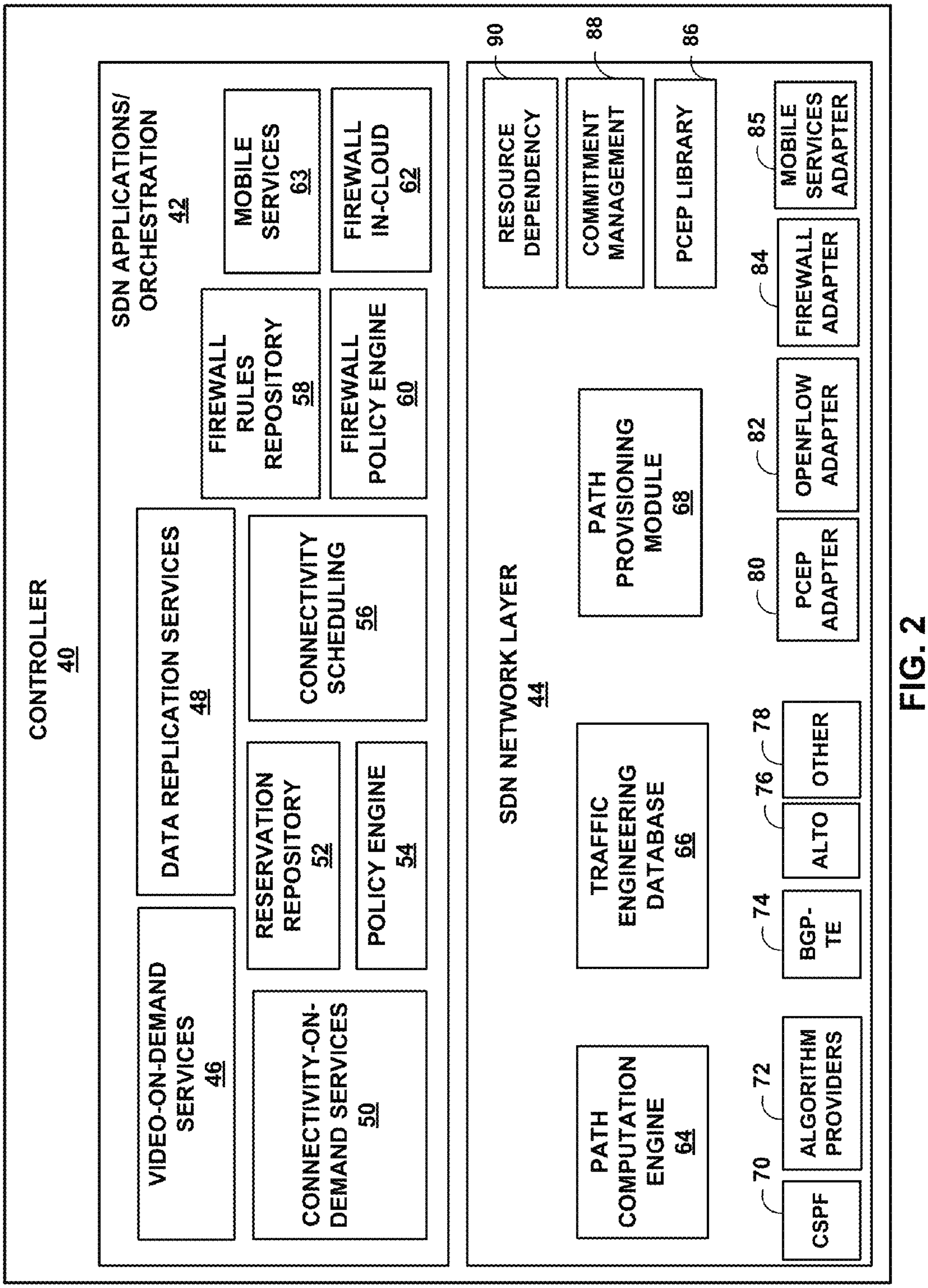
FIG. 2 is a block diagram illustrating an example controller in accordance with techniques described herein.

FIG. 2 is a block diagram illustrating an example controller in accordance with this disclosure. Controller 40 is implemented on one or more devices running in the cloud or in the service provider premises, controlling the nodes in the network in which it is placed.

In one example, a video server receives a subscriber's request from a video service application on the client for streaming video. The video server does not know where the subscriber is physically located. Rather than just relying on the video server to make a guess about which data center to send the video traffic from for that subscriber, the video service application on the client can communicate with video-on-demand services module 46 of controller 40 via a northbound interface of video-on-demand services module 46. The video service application on the client can specify to video-on-demand services module 46 the content and the content-type (high-definition or standard definition). In response, the video-on-demand services module 46 can obtain information regarding the closest data center that has the capacity to service the content-type and can indicate to the video service application on the client the data center from which it should fetch the video. For example, video-on-demand services module 46 may pass the request to connectivity scheduling module 56, which may instruct ALTO module 76 to query an ALTO server for the closest server or data center hosting the video. The ALTO server in the network is receiving BGP-TE feeds from the network so is aware of the network topology. The ALTO server provides the content server location to ALTO module 76 which passes the information up to the connectivity scheduling module 56.

In addition, the video service application on the client can request a bandwidth-guaranteed path (e.g., path having 6 megabits of bandwidth) with certain characteristics. In accordance with the techniques of this disclosure, the video service application on the client can communicate with connectivity-on-demand services module 50 of controller 4, via a northbound interface of connectivity-on-demand services module 50, to request the path. In some examples, connectivity-on-demand services module 50 may reference reservation repository 52, and/or may reference policies applied by policy engine 54. Connectivity-on-demand services module 50 provides the client requirements to path computation engine 64 in SDN network layer 44. In response, the path computation engine 64 computes a path in the network based on network topology information found in traffic engineering database (TED) 66.

After path computation engine 64 computes the path having the guaranteed bandwidth, the path provisioning module 68 of SDN network layer 44 provisions the computed path in the network. As one example, path provisioning module 68 (or path computation element protocol (PCEP) Adapter 80) provides information to the routers in the network to give the head-end router an indication of the path, such as by providing an Explicit Route Object (ERO). The router signals the path using Resource Reservation Protocol with Traffic Engineering extensions (RSVP-TE) to signal a Multi-Protocol Label Switching (MPLS) LSP. As another example, OpenFlow adaptor 82 may provision the path using OpenFlow. In this manner, controller 40 can provide the video service application on the client with a guarantee from connectivity-on-demand services module 50 that the bandwidth is available on the path through the network chosen by path computation engine 64 and provisioned by path provisioning module 68. Thus, the video service application client was able to not only able to connect to the best data-center that could serve the content, but also reserve network resources to ensure that user gets a great video watching experience.

In one example, assume some kind of attack is happening on the Internet (e.g. hackers trying to bring down the Department of Defense website). A network administrator wants to block all traffic coming from a certain set of hosts. Using the northbound API associated with firewall-in-cloud module 62, the network administrator's client device can communicate with controller 40 via a northbound API to request to block the traffic from the hosts. Firewall-in-cloud module 62 converts the instructions into firewall-specific rules that need to be programmed into routers in the network. For example, firewall-in-cloud module 62 may generate a firewall rule such as "if traffic comes from IP address X, then drop." Firewall-in-cloud module 62 may use firewall policy engine 60 and/or firewall rules repository 58 in generating the firewall rules.

Firewall-in-cloud module 62 provides the firewall rules to firewall adapter 84. Firewall adapter 84 programs the appropriate router(s) in the network with the generated rules using commit commands on the router. Commitment management module 88 may be involved in this process. The router uses its usual firewall components, but the firewall rules are received automatically from the firewall adapter 84. In this manner, the network administrator does not need to individually program one or more routers in the network by individual specific configuration commands. Instead, the network administrator can use the northbound interfaces to tell the SDN controller 40 at a high level what outcome is desired in the network. The SDN controller 40 breaks down the request into specific configuration commands and configures individual routers in the network with those commands. If the network uses independent, standalone firewall devices that sit at the edges of the network, then the firewall adapter 84 will program the firewall devices (rather than the routers) and thus accomplish the same behavior.

In some aspects, SDN controller 40 also can provide a virtualization environment interconnecting two or more data centers, for example. For example, a network administrator may request a data replication event, such as a request to cause data stored at a first data center to be replicated (stored) at a second data center. The network administrator's client device can interact with a northbound API of controller 40 associated with data replication services module 48. Data replication services module 48 receives the request and can invoke connectivity scheduling module 56. Connectivity scheduling module 56 is receiving network topology data at TED 66, such as via BGP-TE 74. Connectivity scheduling module 56 causes path computation engine 64 to compute a path between the data centers. For example, path computation engine 64 may use CSPF 70 or other algorithm providers 72 for computing a path.

Path provisioning module 68 provisions the path, such as by using PCEP adapter 80 to provide the path ERO to the head end router of the path. For example, the head end router may signal an LSP over the path using RSVP-TE, for sending the data between the data centers enabling the replication. In the case of the data replication, the LSP path may not need to be the shortest or best path, which can be taken into account by path computation engine 64. Connectivity scheduling module 56 may use OpenFlow adapter 82 to map the data stream to the LSP. Multiple data streams can be mapped to the same network path. Connectivity scheduling module 56 can provide path resizing and rerouting based on changing needs, such as changing requests by the network administrator, or changes to network topology as learned via BGP-TE, ALTO, or other protocol on the southbound side of SDN network layer 44.

SDN controller 40 can address issues facing customers. For example, as customers continue to adopt virtualization technologies in their data centers, and ramp up on virtual machines, workload mobility, and dynamic resource sharing, this can cause problems in efficient configuration of the network that lead to sub-par performance and operational inefficiencies, i.e., too much manual overhead. In accordance with the techniques of this disclosure, SDN controller 40 can reduce the impact of certain problems with data center resource management, particularly across multiple data centers around capacity planning, data center utilization, and efficient operations. This may allow for decreases in time to market for new applications in services within existing data centers. The SDN controller 40 may provide certain benefits to the customers, such as network resource isolation while retaining control, dynamic allocation and sharing of resources leading to greater efficiencies, and an ability to more easily build services utilizing resources across multiple data centers.

By using published and well-defined interfaces between its various modules, the SDN controller 40 can enable development and deployment of custom applications and customized network engineering. In one example, a customer might write its own path computation module 64 that is highly optimized for that customer's network topology (e.g. ring topology) or that customer's application. The customer could then replace the standard path computation module in the SDN controller with the customized path computation module, while retaining all other functionality.

In some aspects, SDN controller 40 provides the ability to selectively steer traffic via an application trigger in a dynamic manner. Based upon an application trigger to sample a particular video stream for quality monitoring, SDN controller 40, which in this case includes OpenFlow Adapter 82, will dynamically program the router to steer the selected video stream out an alternative port for video quality monitoring purposes.

Many customers do not have the desired level of visibility and control into the applications running on their network. Not just this visibility, but then also the ability to make proactive, critical, real-time decisions on these flows is an important requirement. In the security space, SDN controller 40 allows customers to control threats by monitoring traffic for attacks by sending a stream to external analyzer, and dynamically isolating offending flows/users when a threat is identified.

Another application where SDN controller 40 may be used is lawful intercept, whereby individual traffic flows can be identified, and then according to a policy, dynamically mirrored to an external monitor for further analysis and processing. SDN controller 40 can provide proactive and automated application monitoring and intelligence that will speed time to business decisions and outcomes. SDN controller 40 can also reduce security risks, and reduce overhead for application visibility and control by bypassing manual methods of collection and analysis. SDN controller 40 can also reduce overall network expenditure, since the SDN controller 40 can steer flows from multiple routers along the same path, without requiring a per-router lawful intercept port.

In another example aspect, SDN controller 40 can be used to dynamically reserve bandwidth for high definition video sessions.

In one example, a bandwidth calendaring application (BCA) executing on connectivity scheduling module 56 accepts requests from client applications for one or more temporarily dedicated paths between specified endpoints. Connectivity scheduling module 56 interfaces with path computation engine 64 in the SDN network layer 44 of controller 40. TED 66 receives base network topology and overlay network topology information from network devices, e.g., via BGP-TE module 74 and ALTO module 76. Path computation engine 64 analyzes the various topologies to reconcile requests from multiple client applications, and attempts to identify paths through a layer or combination of layers of the network that can be established at the requested time in view of the specifications requested for the temporarily dedicated paths and the anticipated bandwidth/capacity available in the network.

Path computation engine 64 schedules the identified paths through the one or more layers of the network to carry traffic for the requested paths. To then establish a requested path, path computation engine 64 instructs path provisioning module 68 to program, at the scheduled time, path forwarding information into one or more network nodes at any layer of the multi-layer, multi-topology network that participates in forwarding traffic along the identified path. For example, path provisioning module 68 may provide the computed path to the head-end router of the path, which in turn uses the path information to signal an LSP along the specified path using RSVP-TE. In another example, path provisioning module 68 may program path forwarding information (e.g., including MPLS labels) directly into each network device along the path. In this way, connectivity scheduling module 56 and path computation engine 64 may establish dedicated bandwidth channels, in the form of reserved paths, through the network as well as steer traffic onto the dedicated bandwidth channels to provide connectivity between distributed client applications, for instance.

The techniques may provide one or more advantages. For example, connectivity scheduling module 56 may have access by operation of path computation engine 64 and TED 66 to an enhanced view of the current state of the network at multiple different layers, which may enable path computation engine 64 to identify paths that are not visible to a label edge router, for example, having a more limited view. Path computation engine 64 may additionally, by virtue of having access to this enhanced view, steer traffic to underutilized portions of the network to increase the network capacity utilization. Still further, using connectivity scheduling module 56 and path computation engine 64 to identify, establish, and in some cases preempt temporarily dedicated paths for reconciling multiple, possibly conflicting application requests may reduce first-in-time, first-in-right access to network resources in favor of explicit, centralized prioritization of application requests for dedicated paths.

In some examples, a northbound API GUI associated with connectivity scheduling module 56 can show MPLS paths and bandwidth reservations. The northbound API GUI can also include SSH terminals into routers to show OpenFlow entries. In some examples, connectivity scheduling module 56 may provide a Bandwidth Calendaring Application Hybrid Mode that uses a combination of both Openflow and PCE to program devices in the network. Path provisioning module 68 uses PCEP adapter 80 to program specific bandwidth reservations across backbone via MPLS for the user's video flows. Path provisioning module 68 uses OpenFlow adapter 82 to program a specific forwarding path for the users video flows.

In some examples, path computation engine 64 may determine that an end-to-end path through the overlay network layer is not available, and so PCEP adapter 80 may program a tunnel on a path computed in a base network layer and store a new overlay network link for the tunnel to the topology information for the overlay network layer in the multi-topology traffic engineering database 66. Openflow adapter 82 may program the network device state information for the tunnel to overlay switches in the overlay network layer based on the new overlay network link stored by the PCEP adapter 80 as part of the end-to-end path to service a request. In some examples, PCEP adapter 80 may refer to PCEP library 86. PCEP adapter 80 may, in some examples, refer to resource dependency 90.

In other examples, connectivity scheduling module 56 may provide a Bandwidth Calendaring Application Openflow Mode, in which path provisioning module 68 uses only OpenFlow adapter 82 to program the network for the specific forwarding path for user's video flows.

Further example mechanisms for SDN controlled bandwidth calendaring are found in U.S. application Ser. No. 13/339,983, filed Dec. 29, 2011, entitled "Multi-Topology Resource Scheduling within a Computer Network," the entire content of which is incorporated by reference herein.

In some examples, SDN controller 40 can also provide mobile network control. Mobile core control plane applications such as subscriber session setup, authentication, charging, and signaling execute on general-purpose hardware of the data center intermediated with the mobile core by SDN controller 40. Subscriber devices issue service requests via radio access networks toward the mobile core, which in turn redirects the control plane messages to the SDN controller 40 to encapsulate the control plane messages within a SDN protocol. For each such service request from a subscriber device, a northbound interface associated with mobile services module 63 of SDN controller 40 extracts and processes the control plane messages for subscriber session management. The mobile services adapter 85 in the SDN network layer 44 provides to the mobile core, responsive to the service request and using the SDN protocol, any service responses or other control plane messages that the mobile core forwards to the corresponding subscriber device for subscriber session management and control. In addition, the mobile core control plane applications of the data center may determine and communicate to northbound interfaces of mobile services module 63 mobility-specific information for processing and forwarding subscriber data traffic for the subscriber devices. Mobile services adapter 85 in turn programs the support nodes of the mobile core data plane with the mobility-specific information to configure data plane processing and forwarding for subscriber data traffic associated with a subscriber session for the subscriber device.

For example, assume a mobile subscriber wants to communicate from his mobile handset out of California to a friend's mobile device in Minnesota and there is no network path already set up between the two. The mobile handset will interface with northbound APIs of mobile services 63, which in turn cause mobile services adapter 85 to first set up an MPLS transport path between California and Minnesota. For example, mobile services 63 may involve PCE 64 to determine an appropriate path. Mobile services adapter 85 can call in the mobile-specification application to signal all the mobile protocol parameters so that the mobile phone call can be successfully completed between California and Minnesota. In some cases, mobile services adapter 85 can configure each node in the path with the appropriate parameters, and in other cases mobile services adapter 85 can provide the parameter information to the requesting mobile device or other device to allow that device to perform the signaling and setup based on the parameters. After those parameters are all set up, the user's mobile phone call connects. In this manner, controller 40 can facilitate automatic services creation.

Example mechanisms for an SDN controlled mobile network that can be used by controller 40 are found in U.S. application Ser. No. 13/724,975, filed Dec. 21, 2012, entitled "Software-Defined Mobile Core," the entire content of which is incorporated by reference herein.

Figure 3:
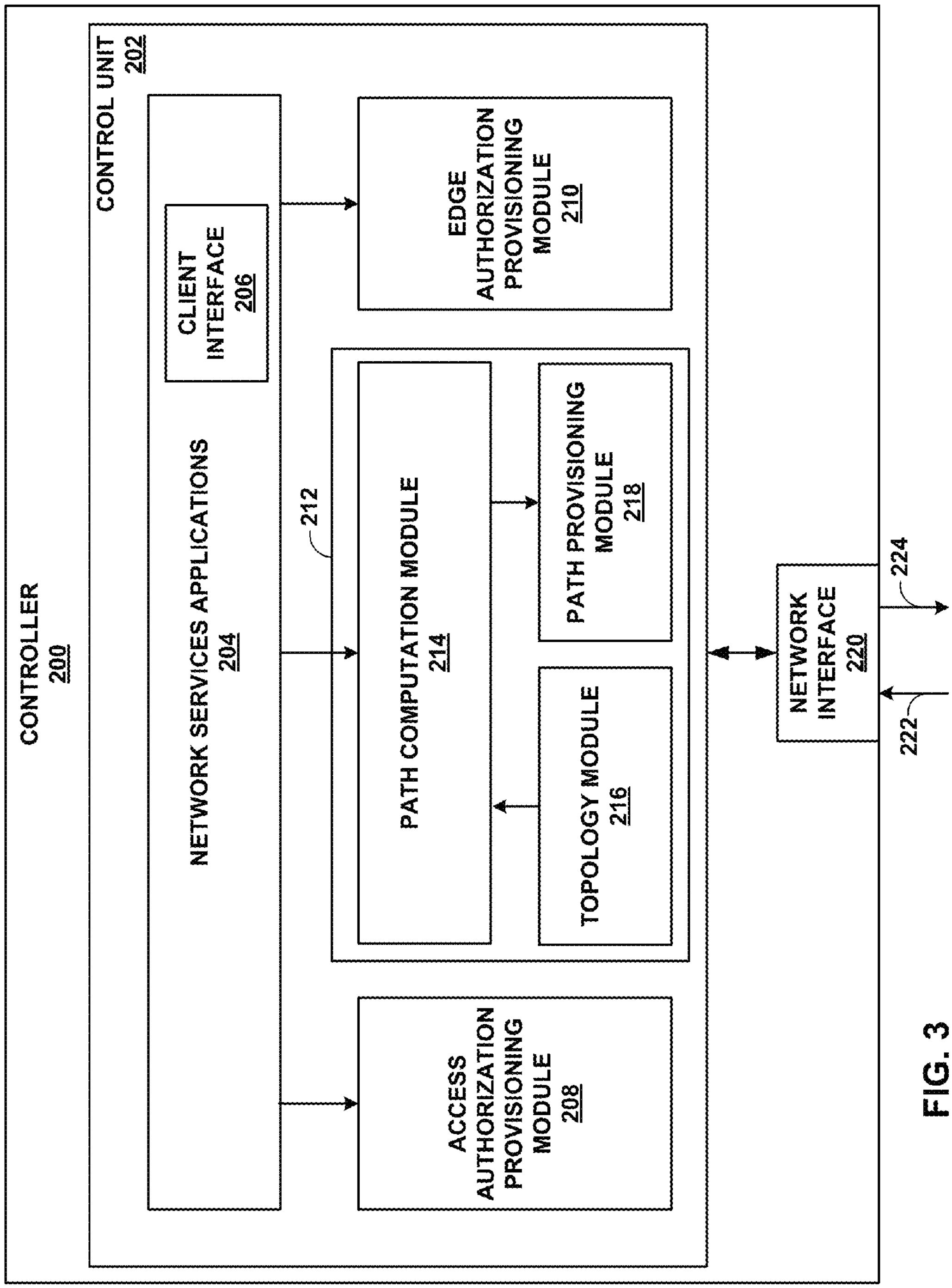
FIG. 3 is a block diagram illustrating an example controller in accordance with techniques described herein.

FIG. 3 is a block diagram illustrating an example controller that provides certain application-aware functionality such as connectivity scheduling. For example, controller 200 receives path requests, computes and schedules paths that satisfy the path requests, and establishes requested paths in a path computation domain according to techniques described herein. For simplicity, FIG. 3 is described in terms of the example of connectivity scheduling (also referred to as bandwidth calendaring), but controller 200 may also include other use-case functionality not shown in FIG. 3. Controller 200 may include a server or network controller, for example, and may represent an example instance of controller 35 of FIG. 1 and of controller 40 of FIG. 2.

Controller 200 includes a control unit 202 coupled to a network interface 220 to exchange packets with other network devices by inbound link 222 and outbound link 224. Control unit 202 may include one or more processors (not shown in FIG. 3) that execute software instructions, such as those used to define a software or computer program, stored to a computer-readable storage medium (again, not shown in FIG. 2), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 202 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 202 provides an operating environment for network services applications 204, access authorization provisioning module 208, path computation element 212, and edge authorization provisioning module 210. In one example, these modules may be implemented as one or more processes executing on one or more virtual machines of one or more servers. That is, while generally illustrated and described as executing on a single controller 200, aspects of these modules may be delegated to other computing devices.

Network services applications 204 represent one or more processes that provide services to clients of a service provider network that includes controller 200 to manage connectivity in the aggregation domain (alternatively referred to as the "path computation domain") according to techniques of this disclosure. Network services applications 204 may provide, for instance, include Voice-over-IP (VoIP), Video-on-Demand (VOD), bulk transport, walled/open garden, IP Mobility Subsystem (IMS) and other mobility services, and Internet services to clients of the service provider network. Networks services applications 204 require services provided by path computation element 212, such as node management, session management, and policy enforcement. Each of network services applications 204 may include client interface 206 by which one or more client applications request services. Client interface 206 may represent a command line interface (CLI) or graphical user interface (GUI), for instance. Client 206 may also, or alternatively, provide an application programming interface (API) such as a web service to client applications.

Network services applications 204 issue path requests to path computation element 212 to request paths in a path computation domain controlled by controller 200. For example, a path request includes a required bandwidth or other constraint and two endpoints representing an access node and an edge node that communicate over the path computation domain managed by controller 200. Path requests may further specify time/date during which paths must be operational and CoS parameters (for instance, bandwidth required per class for certain paths).

Path computation element 212 accepts path requests from network services applications 204 to establish paths between the endpoints over the path computation domain. Paths may be requested for different times and dates and with disparate bandwidth requirements. Path computation element 212 reconciling path requests from network services applications 204 to multiplex requested paths onto the path computation domain based on requested path parameters and anticipated network resource availability.

To intelligently compute and establish paths through the path computation domain, path computation element 212 includes topology module 216 to receive topology information describing available resources of the path computation domain, including access, aggregation, and edge nodes, interfaces thereof, and interconnecting communication links.

Path computation module 214 of path computation element 212 computes requested paths through the path computation domain. In general, paths are unidirectional. Upon computing paths, path computation module 214 schedules the paths for provisioning by path provisioning module 218. A computed path includes path information usable by path provisioning module 218 to establish the path in the network. Provisioning a path may require path validation prior to committing the path to provide for packet transport. Path computation module 214 may correspond to path computation engine 64 (FIG. 2) and path provisioning module 218 may correspond to path provisioning module 68.

Figure 4:
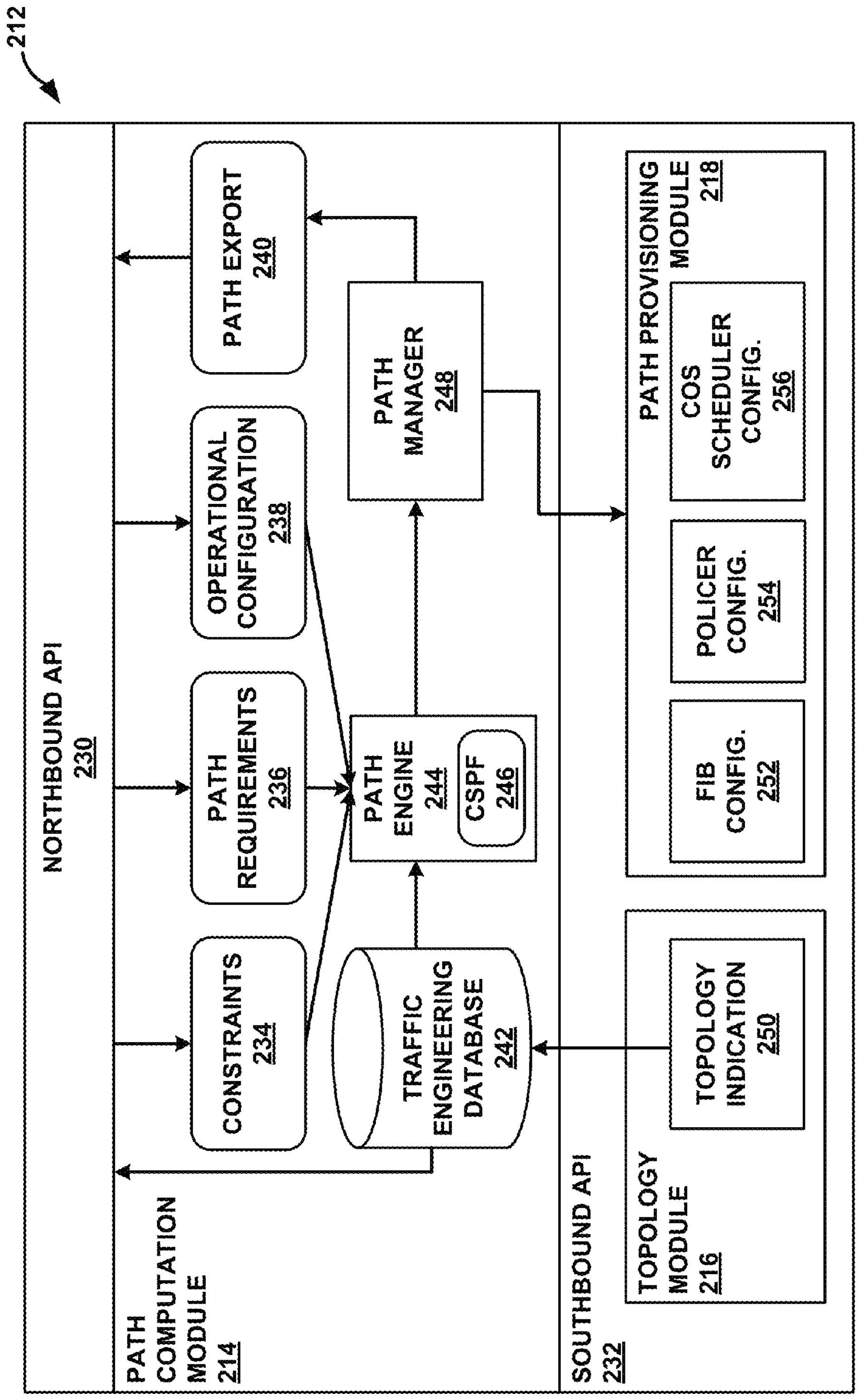
FIG. 4 is a block diagram illustrating an example path computation element in accordance with this disclosure.

FIG. 4 is a block diagram illustrating an example implementation of path computation element 212 of controller 200 of FIG. 3. In this example, path computation element 212 includes northbound and southbound interfaces in the form of northbound application programming interface (API) 230 and southbound API (232). Northbound API 230 includes methods and/or accessible data structures by which network services applications 204 may configure and request path computation and query established paths within the path computation domain. Southbound API 232 includes methods and/or accessible data structures by which path computation element 212 receives topology information for the path computation domain and establishes paths by accessing and programming data planes of aggregation nodes and/or access nodes within the path computation domain.

Path computation module 214 includes data structures to store path information for computing and establishing requested paths. These data structures include constraints 234, path requirements 236, operational configuration 238, and path export 240. Network services applications 204 may invoke northbound API 230 to install/query data from these data structures. Constraints 234 represent a data structure that describes external constraints upon path computation. Constraints 234 allow network services applications 204 to, e.g., modify link attributes before path computation module 214 computes a set of paths. For examples, Radio Frequency (RF) modules (not shown) may edit links to indicate that resources are shared between a group and resources must be allocated accordingly.

Network services applications 204 may modify attributes of a link to effect resulting traffic engineering computations. In such instances, link attributes may override attributes received from topology indication module 250 and remain in effect for the duration of the node/attendant port in the topology. A link edit message to constraints 234 may include a link descriptor specifying a node identifier and port index, together with link attributes specifying a bandwidth, expected time to transmit, shared link group, and fate shared group, for instance. The link edit message may be sent by the PCE 214.

Operational configuration 238 represents a data structure that provides configuration information to path computation element 214 to configure the path computation algorithm with respect to, for example, class of service (CoS) descriptors and detour behaviors. Operational configuration 238 may receive operational configuration information in accordance with CCP. An operational configuration message specifies CoS value, queue depth, queue depth priority, scheduling discipline, over provisioning factors, detour type, path failure mode, and detour path failure mode, for instance. A single CoS profile may be used for the entire path computation domain. Example CoS values are described in U.S. application Ser. No. 13/842,453, filed Mar. 15, 2013, entitled "Aggregation Network with Centralized Control," the entire content of which is incorporated by reference herein. The Service Class assigned to a Class of Service may be independent of the node as an attribute of the path computation domain.

Path export 240 represents an interface that stores path descriptors for all paths currently committed or established in the path computation domain. In response to queries received via northbound API 230, path export 240 returns one or more path descriptors. Queries received may request paths between any two edge and access nodes terminating the path(s). In some examples, path descriptors may be used by network services applications 204 to set up forwarding configuration at the edge and access nodes terminating the path(s). A path descriptor may include an Explicit Route Object (ERO). A path descriptor or "path information" may be sent, responsive to a query from an interested party. A path export message delivers path information including path type (primary or detour); bandwidth for each CoS value. In response to receiving the path descriptor, the receiving device may use RSVP-TE to signal an MPLS LSP from the ingress to the egress of the path.

Path requirements 236 represent an interface that receives path requests for paths to be computed by path computation module 236 and provides these path requests (including path requirements) to path engine 244 for computation. Path requirements 236 may be received, or may be handled by the PCE. In such instances, a path requirement message may include a path descriptor having an ingress node identifier and egress node identifier for the nodes terminating the specified path, along with request parameters including CoS value and bandwidth. A path requirement message may add to or delete from existing path requirements for the specified path.

Topology module 216 includes topology indication module 250 to handle topology discovery and, where needed, to maintain control channels between path computation element 212 and nodes of the path computation domain. Topology indication module 250 may include an interface to describe received topologies to path computation module 214.

Topology indication module 250 may use a topology discovery protocol to describe the path computation domain topology to path computation module 214. In one example, using a cloud control protocol mechanism for topology discovery, topology indication module 250 may receive a list of node neighbors, with each neighbor including a node identifier, local port index, and remote port index, as well as a list of link attributes each specifying a port index, bandwidth, expected time to transmit, shared link group, and fate shared group, for instance.

Topology indication module 250 may communicate with a topology server, such as a routing protocol route reflector, to receive topology information for a network layer of the network. Topology indication module 250 may include a routing protocol process that executes a routing protocol to receive routing protocol advertisements, such as Open Shortest Path First (OSPF) or Intermediate System-to-Intermediate System (IS-IS) link state advertisements (LSAs) or Border Gateway Protocol (BGP) UPDATE messages. Topology indication module 250 may in some instances be a passive listener that neither forwards nor originates routing protocol advertisements. In some instances, topology indication module 250 may alternatively, or additionally, execute a topology discovery mechanism such as an interface for an Application-Layer Traffic Optimization (ALTO) service. Topology indication module 250 may therefore receive a digest of topology information collected by a topology server, e.g., an ALTO server, rather than executing a routing protocol to receive routing protocol advertisements directly.

In some examples, topology indication module 250 receives topology information that includes traffic engineering (TE) information. Topology indication module 250 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the path computation domain. In some instances, indication module 250 executes BGP-TE to receive advertised TE information for inter-autonomous system and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Traffic engineering database (TED) 242 stores topology information, received by topology indication module 250, for a network that constitutes a path computation domain for controller 200 to a computer-readable storage medium (not shown). TED 242 may include one or more link-state databases (LSDBs), where link and node data is received in routing protocol advertisements, received from a topology server, and/or discovered by link-layer entities such as an overlay controller and then provided to topology indication module 250. In some instances, an operator may configure traffic engineering or other topology information within MT TED 242 via a client interface.

Path engine 244 accepts the current topology snapshot of the path computation domain in the form of TED 242 and computes, using TED 242, CoS-aware traffic-engineered paths between nodes as indicated by configured node-specific policy (constraints 234) and/or through dynamic networking with external modules via APIs. Path engine 244 may further compute detours for all primary paths on a per-CoS basis according to configured failover and capacity requirements (as specified in operational configuration 238 and path requirements 236, respectively).

In general, to compute a requested path, path engine 244 determines based on TED 242 and all specified constraints whether there exists a path in the layer that satisfies the TE specifications for the requested path for the duration of the requested time. Path engine 244 may use the Djikstra constrained SPF (CSPF) 246 path computation algorithms for identifying satisfactory paths though the path computation domain. If there are no TE constraints, path engine 244 may revert to SPF. If a satisfactory computed path for the requested path exists, path engine 244 provides a path descriptor for the computed path to path manager 248 to establish the path using path provisioning module 218. A path computed by path engine 244 may be referred to as a "computed" path, until such time as path provisioning 218 programs the scheduled path into the network, whereupon the scheduled path becomes an "active" or "committed" path. A scheduled or active path is a temporarily dedicated bandwidth channel for the scheduled time in which the path is, or is to become, operational to transport flows.

Path manager 248 establishes computed scheduled paths using path provisioning module 218, which in this instance includes forwarding information base (FIB) configuration module 252 (illustrated as "FIB CONFIG. 252"), policer configuration module 254 (illustrated as "POLICER CONFIG. 254"), and CoS scheduler configuration module 256 (illustrated as "COS SCHEDULER CONFIG. 256").

FIB configuration module 252 programs forwarding information to data planes of aggregation nodes or access nodes of the path computation domain. The FIB of an aggregation node or access node includes the MPLS switching table, the detour path for each primary LSP, the CoS scheduler per-interface and policers at LSP ingress. FIB configuration module 252 may implement, for instance, a software-defined networking (SDN) protocol such as the OpenFlow protocol or the I2RS protocol to provide and direct the nodes to install forwarding information to their respective data planes. Accordingly, the "FIB" may refer to forwarding tables in the form of, for instance, one or more OpenFlow flow tables each comprising one or more flow table entries that specify handling of matching packets. FIB configuration module 252 may in addition, or alternatively, implement other interface types, such as a Simple Network Management Protocol (SNMP) interface, path computation element protocol (PCEP) interface, a Device Management Interface (DMI), a CLI, Interface to the Routing System (I2RS), or any other node configuration interface. FIB configuration module interface 62 establishes communication sessions with aggregation nodes or access nodes to install forwarding information to receive path setup event information, such as confirmation that received forwarding information has been successfully installed or that received forwarding information cannot be installed (indicating FIB configuration failure). Additional details regarding PCEP may be found in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, and in "Path Computation Element (PCE) Communication Protocol (PCEP)," Network Working Group, Request for Comment 5440, March 2009, the entire contents of each of which being incorporated by reference herein. Additional details regarding I2RS are found in "Interface to the Routing System Framework," Network Working Group, Internet-draft, Jul. 30, 2012, which is incorporated by reference as if fully set forth herein.

FIB configuration module 252 may add, change (i.e., implicit add), or delete forwarding table entries in accordance with information received from path computation module 214. A FIB configuration message from path computation module 214 to FIB configuration module 252 may specify an event type (add or delete); a node identifier; a path identifier; one or more forwarding table entries each including an ingress port index, ingress label, egress port index, and egress label; and a detour path specifying a path identifier and CoS mode.

Policer configuration module 254 may be invoked by path computation module 214 to request a policer be installed on a particular aggregation node or access node for a particular LSP ingress. As noted above, the FIBs for aggregation nodes or access nodes include policers at LSP ingress. Policer configuration module 254 may receive policer configuration requests. A policer configuration request message may specify an event type (add, change, or delete); a node identifier; an LSP identifier; and, for each class of service, a list of policer information including CoS value, maximum bandwidth, burst, and drop/remark. FIB configuration module 252 configures the policers in accordance with the policer configuration requests.

CoS scheduler configuration module 256 may be invoked by path computation module 214 to request configuration of CoS scheduler on the aggregation nodes or access nodes. CoS scheduler configuration module 256 may receive the CoS scheduler configuration information. A scheduling configuration request message may specify an event type (change); a node identifier; a port identity value (port index); and configuration information specifying bandwidth, queue depth, and scheduling discipline, for instance.

Figure 5:
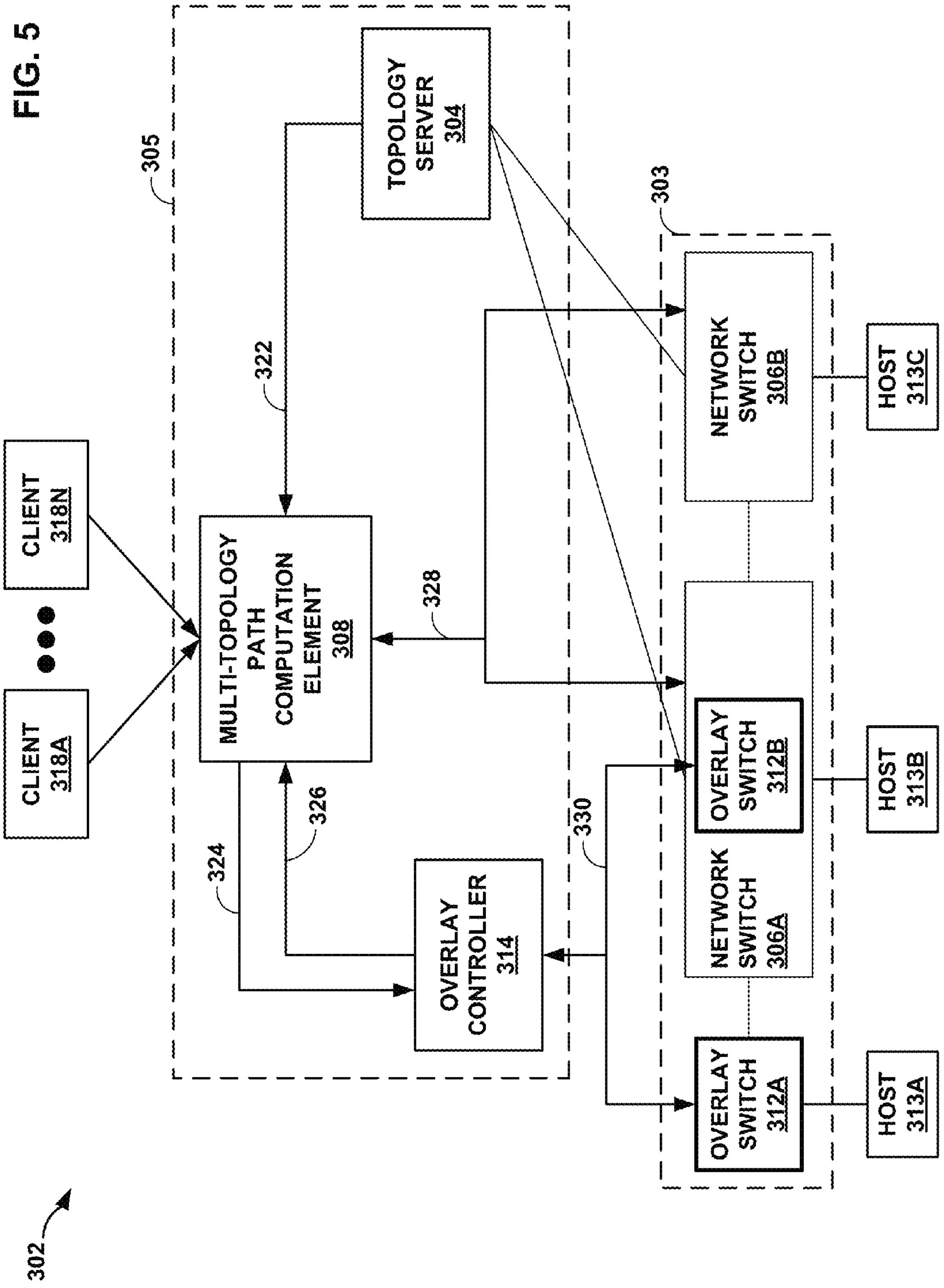
FIG. 5 is a block diagram illustrating an example network system in accordance with techniques described herein.

FIG. 5 is a block diagram illustrating an example network system for providing an overall SDN framework in accordance with techniques described herein. Network system 302 includes a multi-topology network 303 (hereinafter, "network 303") that includes multiple layers that transport traffic between hosts 313A-313C (collectively, "hosts 313"). Hosts 313 may execute a distributed application that requires massive data transfer over network 303 at different times in a dynamic application processing environment. Each of hosts 313 may represent a data server or application processing node, for example. Network system 302 includes an SDN controller 305 that includes multi-topology path computation element 308 (also referred to as "PCE 308"), overlay controller 314, and topology server 304. SDN controller 305 may correspond to any of SDN controller 35, SDN controller 40, or controller 200 of FIGS. 1-3, for example. Overlay controller 314 may correspond to OpenFlow adapter 82; topology server 304 may correspond to BGP-TE 74, ALTO 76, and/or other 78; and multi-topology path computation element 308 may correspond to path computation engine 64 of FIG. 2, for example. SDN controller 305 may use techniques described above to orchestrate the network 303 to service requests from applications by establishing paths, reserving resources, load balancing, and mapping traffic flows, for instance.

A base network layer of network 303 (or "base network") includes network switches 306A-306B (collectively, "network switches 306") connected to hosts 313B, 313C and arranged in a physical topology. Network switches 306 receive and forward packet data units (PDUs) for network flows according to forwarding information programmed into the switches by an administrator or external entity (e.g., overlay controller 314 or multi-topology path computation element 308) and/or according to forwarding information learned by the switches, whether by operation of one or more protocols (e.g., interior gateway protocols (IGPs)) or by recording information learned during PDU forwarding. Each of network switches 306 may represent a router, a layer three ("L3") switch, a layer two ("L2") switch, an L2/L3 switch, or another network device that switches traffic according to forwarding information. Accordingly, PDUs forwarded by network switches 306A may include, for example, L3 network packets (e.g., Internet Protocol) packets and/or L2 packets (e.g., Ethernet datagrams or Asynchronous Transfer Mode (ATM) cells). PDUs may be unicast, multicast, anycast, and/or broadcast.

An overlay network layer of network 303 includes overlay switches 312A-312B (collectively, "overlay switches 312") arranged in a virtual topology "over" a physical topology defined by network switches 306. Individual links of the virtual topology of the overlay network (or "overlay links") may be established paths through the base network and/or physical links connecting overlay switches 312. The overlay network may represent a virtual private network (VPN), an OpenFlow network consisting of one or more OpenFlow switches, or an application-layer network with selection functionality built-in to endpoint devices, for example. Accordingly, each of overlay switches 312 may represent a router or routing instance (e.g., a virtual routing and forwarding (VRF) instance); a Virtual Private Local Area Network (LAN) Service (VPLS) instance; a dedicated L2, L3, or L2/L3 switch; or a virtual or "soft" switch (e.g., an OpenFlow switch) implemented by a router or by a dedicated switch, for example. Overlay switch 312A, for instance, represents a dedicated overlay switch. Overlay switch 312B is implemented by network switch 306A and may represent, for instance, a soft switch. Network 303 may include multiple overlay network layers of different or similar types (e.g., multiple VPNs and/or OpenFlow networks).

Topology server 304 receives topology information from network switches 306 for the base network of multi-topology network 303. For example, topology server 304 may execute one or more IGPs or Exterior Gateway Protocols (e.g., the Border Gateway Protocol (BGP)) to listen to routing protocol advertisements sent by network switches 306. Topology server 304 collects and stores the base network topology information, then provides the base network topology information to multi-topology path computation element (PCE) 308 in base topology update messages 322. Topology information may include traffic engineering information for the network links, such as the links' administrative attributes and bandwidth at various priority levels available for use by label-switched paths (LSPs). In some examples, network switches 306 may send topology update messages to topology server 304 that specify L2 link information for L2 links connecting the network switches. In some examples, topology server 304 is a component of PCE 308.

Overlay controller 314 receives topology information for the overlay network of multi-topology network 303 in topology update messages sent by overlay switches 312 in respective communication sessions 330. Topology update messages sent by overlay switches 312 may include virtual and physical switch port information, PDUs and associated metadata specifying respective ports and/or interfaces on which PDUs are received. In some examples, overlay controller 314 is a routing protocol listener that executes one or more routing protocols to receive routing protocol advertisements sent by overlay switches 312. Such routing protocol advertisements may be associated with one or more VRFs, for instance. Overlay controller 314 collects and stores the overlay topology information, then provides the overlay topology information to PCE 308 in overlay topology update messages 326. In some examples, overlay controller 314 is a component of PCE 308.

Network switches 306 may be configured to or otherwise directed to establish paths through the base network of multi-topology network 303. Such paths may include, for instance, IP tunnels such as Generic Route Encapsulation (GRE) tunnels, General Packet Radio Service (GPRS) Tunneling Protocol (GTP) tunnels, LSPs, or a simple route through the base network or a VPN (identified by a static route with a route target, for instance). Network switches 306 provide path status information for paths established through the base network of multi-topology network to PCE 308 in communication sessions 328. Path status (alternatively, "path state" or "LSP state") information may include descriptors for existing, operational paths as well as indications that an established path or path setup operation has failed. For example, network switch 306A may attempt establish an LSP using a reservation protocol such as Resource reSerVation Protocol (RSVP) but fail due to insufficient network resources along a path specified by an Explicit Route Object (ERO). As a result, network switch 306A may provide an indication that the path setup operation failed to PCE 308 in a communication session 328. PCE 308 receives path status information and adds established paths through the base network of network 303 as links in the overlay network topology.

PCE 308 presents an interface by which clients 318A-318N (collectively, "clients 318") may request, for a specified time, a dedicated path between any combination of hosts 313. For example, client 318A may request a 100 MB/s path from host 313A to host 313B from 1 PM to 3 PM on a particular date. As another example, client 318N may request a 50 MB/s path from host 313A to host 313C from 2 PM to 3 PM on the same date. As a still further example, client 318A may request a mesh (or "multipath") of 50 MB/s paths connecting each of hosts 313 to one another from 4 PM to 6 PM on a particular date. The requested mesh is a multipoint-to-multipoint path consisting of multiple point-to-point paths. In addition to the bandwidth, hosts, and time path parameters exemplified above, clients 318 may request paths that conform to other quality of service (QoS) path request parameters, such as latency and jitter, and may further specify additional associated classifiers to identify a flow between the specified endpoints. Example flow classifiers (or "parameters") are provided below.

PCE 308 uses base network topology information for network 303 received from topology server 304, overlay network topology information for network 303 received from overlay controller 314, and path status information received from network switches 306 to compute and schedule paths between hosts 313 through network 303 that satisfy the parameters for the paths requested by clients 318. PCE 308 may receive multiple path requests from clients 318 that overlap in time. PCE 308 reconciles these requests by scheduling corresponding paths for the path requests that traverse different parts of network 303 and increase capacity utilization, for example, or by denying some of the path requests.

At the scheduled time for a scheduled path, PCE 308 installs forwarding information to network 303 nodes (e.g., overlay switches 312 and network switches 306) to cause the nodes to forward traffic in a manner that satisfies the requested path parameters. In some examples, PCE 308 stores all path requests and then attempts to compute and establish paths at respective requested times. In some examples, PCE 308 receives path requests and schedules respective, satisfactory paths in advance of the requested times. PCE 308, in such examples, stores the scheduled paths and uses resources allocated (in advance) for the scheduled paths as a constraint when attempting to compute and schedule later requested paths. For example, where a scheduled path will consume all available bandwidth on a particular link at a particular time, PCE 308 may later compute a requested path at an overlapping time such that the later requested path does not include the completely subscribed link.

A requested path may traverse either or both domains of network 303. That is, a requested path may traverse either or both of the base network and overlay network of multi-topology network 303. For example, because both host 313B and host 313C couple in the base network domain to one of network switches 306, a requested path for traffic from host 313B to host 313C may traverse only the base network domain as a simple network route, for instance, from network switch 306A to network switch 306B. Host 313A, however, couples in the overlay network domain to overlay switch 312A. As a result, any requested path for traffic between host 313A and host 313C, for example, first traverses the overlay network domain and then traverses the base network domain.

PCE 308 installs forwarding information to overlay switches 312 using overlay controller 314. Overlay controller 314 presents a programming interface by which PCE 308 may add, delete, and modify forwarding information in overlay switches 312. Forwarding information of overlay switches 312 may include a flow table having one or more entries that specify field values for matching PDU properties and a set of forwarding actions to apply to matching PDUs. A set of one or more PDUs that match a particular flow entries represent a flow. Flows may be broadly classified using any parameter of a PDU, such as source and destination MAC and IP addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

PCE 308 invokes the programming interface of overlay controller 314 by sending overlay network path setup messages 324 directing overlay controller 314 to establish paths in the overlay network of network 303 and/or steer flows from hosts 313 onto established paths. Overlay controller 314 responds to overlay network path setup messages 324 by installing, to overlay switches 312 using communication sessions 330, forwarding information that implements the paths and/or directs flows received from hosts 313 onto established paths.

PCE 308 installs forwarding information to network switches 306 using communication sessions 328. Each of network switches 306 may present a programming interface in the form of a management interface, configuration interface, and/or a path computation client (PCC). PCE 308 may invoke the programming interface of network switches 306 to configure a tunnel (e.g., an LSP), install static routes, configure a VPLS instance, configure an Integrated Routing and Bridging (IRB) interface, and to otherwise configure network switches 306 to forward packet flows in a specified manner. In some instances, PCE 308 directs one or more of networks switches 306 to signal a traffic engineered LSP (TE LSP) through the base network of network 303 to establish a path. In this way, PCE 308 may program a scheduled path through network 303 by invoking a programming interface of only the head network device for the path.

At the end of a scheduled time for a requested path, PCE 308 may again invoke the programming interfaces of network switches 306 and overlay switches 312 to remove forwarding information implementing the requested paths. In this way, PCE 308 frees resources for future scheduled paths.

Because PCE 308 has an enhanced view of the current state of the network 303 at both the overlay network layer and base network 303, PCE 308 may identify paths that are not visible to any one of network switches 306 or overlay switches 312 having a more limited view. PCE 308 may additionally, by virtue of having access to this enhanced view, steer traffic to underutilized portions of network 303 to increase capacity utilization of network 303. In addition, centralizing the path computation and establishment with PCE 308 may allow network operators to reconcile multiple, possibly conflicting application path requests and may reduce first-in-time, first-in-right access to network resources in favor of explicit, centralized prioritization of application requests for dedicated paths.

Figure 6:
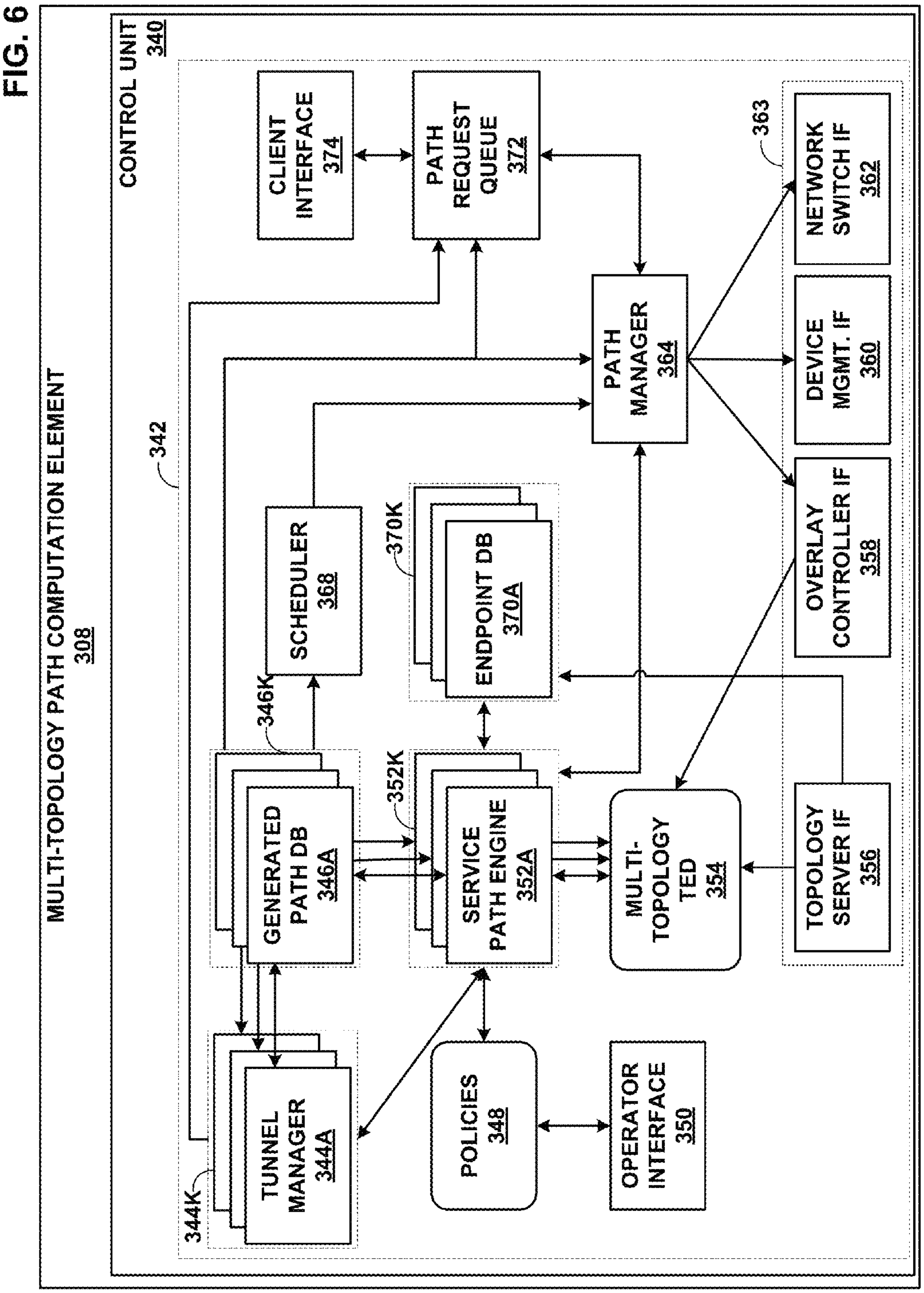
FIG. 6 is a block diagram illustrating an example multi-topology path computation element that receives path requests, computes and schedules paths that satisfy the path requests, and establishes requested paths through a multi-layer, multi-topology network in accordance with techniques described herein.

FIG. 6 is a block diagram illustrating an example multi-topology path computation element that receives path requests, computes and schedules paths that satisfy the path requests, and establishes requested paths through a multi-layer, multi-topology network in accordance with techniques described herein. Multi-topology path computation element 308 may include a server or network controller, for example, and may represent an embodiment of PCE 308 of FIG. 5 and may correspond to controller 35 of FIG. 1, controller 40 of FIG. 2, and/or controller 200 of FIG. 3.

PCE 308 includes a control unit 340 and a network interface (not shown) to exchange packets with other network devices. Control unit may include one or more processors (not shown in FIG. 6) that execute software instructions, such as those used to define a software or computer program, stored to a computer-readable storage medium (again, not shown in FIG. 6), such as non-transitory computer-readable mediums including a storage device (e.g., a disk drive, or an optical drive) or a memory (such as Flash memory or random access memory (RAM)) or any other type of volatile or non-volatile memory, that stores instructions to cause the one or more processors to perform the techniques described herein. Alternatively or additionally, control unit 340 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of one or more of the foregoing examples of dedicated hardware, for performing the techniques described herein.

Control unit 340 provides an operating environment for bandwidth calendaring application (BCA) 342. In one example, BCA 342 is a Java application executing on a virtual machine executed by PCE 308. However, BCA 342 may be implemented using any suitable programming language that produces instructions executable by a suitable platform. Furthermore, while illustrated and described executing on a path computation element 308, aspects of BCA 342 may be delegated to other computing devices.

Bandwidth calendaring application 342 accepts requests from client applications to schedule point-to-point and multipoint-to-multipoint paths (multipaths) between different endpoints. Reference herein to a path encompasses multipaths. Paths may be scheduled at different times and dates, with BCA 342 reconciling path requests from multiple client applications to schedule requested paths through a network based on requested path parameters and anticipated network resource availability.

Clients request paths through a network using client interface 374 of BCA 342. In general, a path request includes a requested date/time, a required bandwidth or other constraint, and at least two endpoints. Client interface 374 may be a command line interface (CLI) or graphical user interface (GUI), for instance. Client 374 may also, or alternatively, provide an application programming interface (API), such as a web service. A user uses a client application to invoke client interface 374 to input path request parameters and submit the request to BCA 342. Client interface 374 receives path requests from clients and pushes the path requests to path request queue 372, a data structure that stores path requests for computation distribution by path manager 364.

To compute and schedule paths through a network intelligently, BCA 342 receives topology information describing available resources at multiple layers of the network. Topology server interface 356 (illustrated as "topology server IF 356") communicates with a topology server to receive topology information for a base network layer of the network, while overlay controller interface 358 communicates with an overlay controller to receive topology information for an overlay network layer of the network. Topology server interface 356 may include a routing protocol daemon that executes a routing protocol to receive routing protocol advertisements, such as Open Shortest Path First (OSPF) or Intermediate System-to-Intermediate System (IS-IS) link state advertisements (LSAs) or BGP UPDATE messages. Topology server interface 356 may in some instances be a passive listener that neither forwards nor originates routing protocol advertisements.

In this example, topology server interface 356 receives topology information that includes traffic engineering (TE) information. Topology server interface 356 may, for example, execute Intermediate System-to-Intermediate System with TE extensions (IS-IS-TE) or Open Shortest Path First with TE extensions (OSPF-TE) to receive TE information for advertised links. Such TE information includes one or more of the link state, administrative attributes, and metrics such as bandwidth available for use at various LSP priority levels of links connecting routers of the domain. In some instances, topology server interface 356 executes Border Gateway Protocol to receive advertised TE information for inter-AS and other out-of-network links. Additional details regarding executing BGP to receive TE info are found in U.S. patent application Ser. No. 13/110,987, filed May 19, 2011 and entitled "DYNAMICALLY GENERATING APPLICATION-LAYER TRAFFIC OPTIMIZATION PROTOCOL MAPS," which is incorporated herein by reference in its entirety.

Topology server interface 356 may in some instances receive a digest of topology information collected by a topology server, rather than executing a routing protocol to receive routing protocol advertisements directly. Topology server interface 356 stores base network topology information with TE information in multi-topology traffic engineering database 354 (illustrated as "multi-topology TED 354," hereinafter "MT TED 354"), which is stored by a computer-readable storage medium of control unit 40 for use in path computation. MT TED 354 is described in further detail below.

Overlay controller interface 358 (illustrated as "overlay controller IF 356") receives topology information from an overlay controller that describes overlay network links connecting overlay switches. In general, overlay network links are not advertised by network switches (e.g., routers) of the base network for the overlay network and so will not be described by topology information received by topology server interface 356. An overlay controller augments the base network topology with overlay network topology links by providing overlay network topology information to overlay controller interface 358, which stores the overlay network topology information to MT TED 354. Overlay controller interface 358 may receive topology information for multiple different overlay networks, including VPNs and/or OpenFlow networks. Different overlay networks may require different instances of overlay controller interface 358 that communicate with network switches of the overlay network or with a topology server, for example, to receive overlay network topology information for respective overlay networks.

Multi-topology traffic engineering database 354 stores topology information for a base network layer and one or more overlay network layers of a network that constitutes a path computation domain for PCE 308. MT TED 354 may organize topology information for respective network layers hierarchically, with the base network topology information supporting the topology information for one or more overlay networks. Paths in a lower-layer topology may appear as links in a higher-layer topology. For example, tunnels (e.g., TE LSPs) created in the base network layer can appears as links in an overlay network TE topology. BCA 342 may then correlate overlay network links with paths established in the base network layer to efficiently compute paths that cross multiple overlay topologies. MT TED 354 may include one or more link-state databases (LSDBs), where link and node data is received in routing protocol advertisements, received from a topology server, and/or discovered by link-layer entities such as an overlay controller and then provided to BCA 342 via overlay controller interface 358. In some instances, an operator may configure traffic engineering or other topology information within MT TED 354 via operator interface 350.

Topology server interface 356 may also receive, from a topology server or by execution of routing protocols to receive routing protocol advertisements that include reachability information, endpoint information that describes endpoints reachable by specified nodes in any of the network topologies. Topology server interface 356 may receive endpoint information for a base layer of the network as well as for one or more services (e.g., VPNs) provided by the network that may correspond to overlay networks of the network. Endpoint information may associate network address prefixes with a nodes of the multi-topology network layers, where network address prefixes may be, e.g., IPv4 or IPv6. For example, topology server interface 356 may receive a BGP UPDATE message advertising a particular subnet as reachable from a particular node of the base network. As another example, topology server interface 356 may receive an Application-Layer Traffic Optimization map that includes PIDs associating respective nodes of a multi-topology network layer with network address prefixes reachable from the nodes. Endpoints that have network addresses that are members of the subnet are therefore reachable from the node, and BCA 342 may calculate paths for those endpoints to terminate (i.e., begin or end) at the node. Topology server interface 356 stores endpoint information received for a layer to a corresponding one of endpoint databases 370A-370K (illustrated as "endpoint DB 370A-370K" and collectively referred to as "endpoint databases 370"), where K refers to a number of layers of the multi-topology network that constitutes a path computation domain for PCE 308. Some of endpoint databases 370 may therefore be associated with respective service instances, e.g., respective VPNs that constitute overlay network layers of a multi-topology network. BCA 342 may therefore use endpoint databases 370 to locate and validate endpoints specified in path requests received from clients.

Each of service path engines 352A-352K (collectively, "SPEs 352") compute requested paths through a layer of the multi-topology network with which it is associated and for which it is responsible. Control unit 340 may execute multiple SPEs 352 concurrently, e.g., as separate processes. Each of SPEs 352 is associated with a corresponding one of generated path databases 346A-346K (illustrated as "generated path DB 346A-346K" and collectively referred to as "generated path databases 346"). Path manager 364 dequeues path requests from path request queue 372 and assigns path requests to SPEs 352 based on the layer of the multi-topology network in which the endpoints reside, as determined by path manager 364 from endpoint databases 370. That is, endpoints reachable by layers of a multi-topology network that is a path computation domain for PCE 308 are stored by at least one of endpoint databases 370, and path manager 364 determines the one or more endpoint databases 370 that include endpoints specified for a dequeued path request.

Paths are unidirectional. If a client requests a bidirectional path, path manager 364 triggers two path requests for the requested path—one for each direction. In some cases, a path may cross multiple layers of the network, e.g., at a gateway to the base layer that is implemented by one of the overlay network nodes or at a network node that participates in multiple overlay networks. In such cases, multiple SPEs 352 may cooperate to compute segments of the multi-layer path that path manager 364 stitches together at the gateway. Upon computing paths, SPEs 352 schedule the paths by storing the paths to respective generated path databases 346. A scheduled path stored in one of generated path databases 346 includes path information used by path manager 364 to establish the path in the network and may include scheduling information used by scheduler 368 to trigger path manager to establish the path. As described in further detail below, path scheduling may require locking generated path databases 346 to perform path validation prior to committing the path.

When a servicing path request received from path manager 364, an SPE 352 may initially validate the request by determining from endpoint databases 370 that the endpoints for the requested path, whether expressed as logical interfaces or network addresses, are known to PCE 308, i.e., exist within the path computation domain of PCE 308. The SPE 352 may additionally validate flow classifiers to ensure that the flow classifiers specified for a requested path exist. If initial validation fails for either/both of these reasons, the SPE 352 rejects the requested path and path manager 364 sends a path rejection message detailing the reasons to the requesting client via client interface 374.

To compute a requested path at a layer of a multi-topology network, a service path engine 352 for the layer uses MT TED 354 and the corresponding one of generated path databases 346 for the layer to determine whether there exists a path in the layer that satisfies the TE specifications for the requested path for the duration of the requested time. SPEs 352 may use the Djikstra constrained SPF (CSPF) and/or the Bhandari Edge disjoint shortest pair (for determining disjointed main and backup paths) path computation algorithms for identifying satisfactory paths though the multi-topology network. If a satisfactory computed path for the requested path exists, the computing service path engine 352 for the layer re-validates the computed path and, if validation is successful, schedules the computed path by adding the computed path to the one of generated path databases 346 for the layer. In addition, the computing SPE 352 adds the requested path start/complete times to scheduler 368. A computed path added to one of generated path databases 346 is referred to as a "scheduled" path, until such time as path manager 364 programs the scheduled path into the multi-topology network, whereupon the scheduled path becomes an "active" path. A scheduled or active path is a temporarily dedicated bandwidth channel for the scheduled time in which the path is, or is to become, operational to transport flows.

As noted above, generated path databases 346 store path information for scheduled and active paths. Path information may include an ERO that specifies a list of overlay or base network nodes for a TE LSP, routes or tunnels to be configured in one or more overlay network or base network nodes, forwarding information for overlay network nodes specifying respective sets of forwarding actions to apply to PDUs inbound to the overlay network nodes, and/or any other information usable by any of topology node interfaces 363 to establish and steer flows onto scheduled paths in a multi-topology network.

SPEs 352 compute scheduled paths based upon a current state (or "snapshot") of the multi-topology network, as represented by MT TED 354 and generated path databases 346. Because multiple SPEs 352 execute simultaneously, in this example, to compute and schedule paths through the multi-topology network, multiple SPEs 352 may attempt to update generated path databases 346 simultaneously, which could in some cases result in network resource oversubscription and failure by PCE 308 to satisfy requested paths. An SPE 352 may therefore, having computed a path, execute a transaction that conforms to the ACID properties (atomicity, consistency, isolation, durability) or another type of atomic transaction to both re-validate and update generated path databases 346 with a scheduled path. That is, the SPE 352 may first lock generated path databases 346 to prevent other SPEs 352 from modifying generated path databases 346. The SPE 352 may then validate the computed path against the locked generated path databases 346 as well as MT TED 354. If the computed path is valid, the SPE 352 updates generated path databases 346 by adding the computed path as a scheduled path. The SPE 352 then unlocks generated path databases 346. In this way, all affected links are updated in the same transaction, and subsequent path validations by other SPEs 352 account for the updates. SPEs 352 may use any suitable data structure locking mechanism, such as monitors, mutexes, or semaphores, to lock generated path databases 346.

If the SPE 352 fails to validate a previously computed path, the SPE 352 attempts to re-compute the path. Upon identifying a satisfactory path against the current snapshot of the multi-topology network, the SPE 352 again attempts to validate the computed path and update generated path databases 346.

In some cases, SPEs 352 may be unable to identify a path through an overlay network with which to satisfy a path request. This failure may be due to any of a number of factors. For example, sufficient network resources with which to satisfy the path request may be unavailable for the scheduled time due, for instance, to previously scheduled paths that include one or more links of the base network layer for any possible paths between the endpoints of the path request at an overlapping time. In this example, path computation fails. In other words, one or more paths between the endpoints of the path request exist, but the paths are already sufficiently subscribed to prevent the additional reservation of adequate resources for the requested path. As another example, SPEs 352 may be unable to identify any paths through an overlay network between the endpoints of the path request because the computation failed due to a missing link in the overlay network. In other words, the computed overlay network graph, after removing unusable edges unable to satisfy path request constraints, includes two disjoint subgraphs of the overlay network. However, in this case, a suitable path may be generated by creating a tunnel through the base layer between the subgraphs for the overlay network.

Where path computation fails because sufficient network resources do not exist at the requested time, the computing SPE 352 may consider policies 348, set by an operator via operator interface 350, that establish priorities among clients of PCE 308 and/or among path request parameters, including bandwidth, hosts, time, and QoS parameters as well as flow classifiers. A policy of policies 348 may prioritize the requested path for which path computation failed over and against one or more scheduled paths of generated path databases 346. In such instances, the computing SPE 352 may preempt one or more of these scheduled paths by removing (again, in accordance with policies 348) the paths from generated path databases 346 and scheduler 368. In addition, the computing SPE 352 in such instances enqueues the removed paths as path requests to path request queue 372. Components of PCE 308 may then again attempt to compute satisfactory paths for the path requests corresponding to paths removed from generated path databases 346. Where SPEs 352 are unable to identify a satisfactory path for such a path request, SPEs 352 direct path manager 364 to send a path rejection message to a requesting client that issued the path request via client interface 374. In effect, PCE 308 revokes a grant of scheduled multi-topology network resources made to the requesting client.

Where path computation fails due to a missing link between disjoint subgraphs of an overlay network each providing reachability to respective endpoints for a requested path, the computing SPE 352 requests one of tunnel managers 344A-344K (collectively, "tunnel managers 344") to establish a tunnel in a lower layer of the multi-topology network. For example, one of SPEs 352 for an overlay network may request a tunnel in a lower layer overlay network or in the base network layer. Each of tunnel managers 344 is associated with one of the layers of the multi-topology network and with one of generated path databases 346. In other words, each of tunnel managers 344 manages tunnels for one of the topologies.

Tunnel managers 344 operate as intermediaries between generated path databases 346 and SPEs 352. A higher layer SPE of SPEs 352 may request a lower layer one of tunnel managers 344 to establish a tunnel between two nodes of the lower layer to create a link in the higher layer. Because a tunnel traverses two layers of the multi-topology network, each of the two nodes may straddle the two layers by having an ingress and egress interface coupling the two layers. That is, a first one of the two nodes may be an ingress network switch having an ingress interface to the base network layer, while a second one of the two nodes may be an egress network switch having an egress interface from the base network layer. The tunnel manager 344, in response, may enqueue a path request specifying the two nodes in the lower layer of the multi-topology network to path request queue 372. If a lower layer SPE 352 is able to schedule a path for the path request, this path becomes a link in the lower layer generated path database 346, and the lower layer SPE 352 notifies the requesting one of tunnel managers 344 with link tunnel information for the link. The tunnel manager 344 propagates this tunnel information to MT TED 354, which triggers the higher layer SPE 352 that a new link is available in the higher layer topology and prompts the higher layer SPE to reattempt computing a satisfactory path for the original requested path. Tunnel managers 344 may also validate tunnel setup at their respective layer of a multi-topology network.

Scheduler 368 instigates path setup by tracking scheduled start times for scheduled paths in generated path databases 346 and triggering path manager 364 to establish the scheduled paths at their respective start times. Path manager 364 establishes each scheduled path using one or more of topology node interfaces 363 including overlay controller interface 358, device management interface 360, and network switch interface 362. Different instances of PCE 308 may have different combinations of topology node interfaces 363.

Path manager 364 may invoke the overlay controller interface 314 to sending overlay network path setup messages, e.g., overlay network path setup messages 24 of FIG. 1, directing an overlay controller to establish paths in an overlay network and/or steer flows from hosts onto established paths in accordance with path information for scheduled paths in generated path databases 346. In this way, BCA 342 may program paths according to a permanent virtual circuit (PVC) (or "hop-by-hop") model by programming forwarding state in network and/or overlay switches to execute the paths being programmed.

Device management interface 360 may represent a Simple Network Management Protocol (SNMP) interface, a Device Management Interface (DMI), a CLI, or any other network device configuration interface. Path manager 364 may invoke device management interface 360 to configure network switches (e.g., routers) with static routes, TE LSPs, or other tunnels in accordance with path information for scheduled paths in generated path databases 346. Network switch interface 362 establishes communication sessions, such as communication sessions 28 of FIG. 1, with network switches to receive and install path state information and to receive path setup event information. Network switch interface 362 may be a PCE protocol (PCEP) interface, a DMI, or SNMP interface, for example.

Path manager 364 may invoke device management interface 360 and/or network switch interface 362 to configure and direct network switches to establish paths in a base network layer or overlay network layer of a multi-topology network. For example, path manager 364 may first configure a TE LSP within a network switch at a network edge, then direct the network switch to signal a path for the TE LSP using RSVP with traffic engineering extensions (RSVP-TE) or another signaling protocol. In this way, BCA 342 may program paths, including TE LSPs, into the network according to a soft PVC (SPVC) model. In this model, the network presents a programming interface that BCA 342 invokes to dynamically set up the SPVCs. In some examples, BCA 342 may use a combination of PVC and SPVC models to program paths into a multi-topology network.

Upon receiving confirmation from topology node interfaces 363 that a scheduled path setup is successful, path manager 364 transitions a status of the scheduled path in generated path databases 346 to "active." At the scheduled end time (if any) for an active path, scheduler 368 notifies path manager 364 to tear down the active path using topology node interfaces 363. After tearing down the path, path manager 364 removes the path from generated paths 346.

Figure 7:
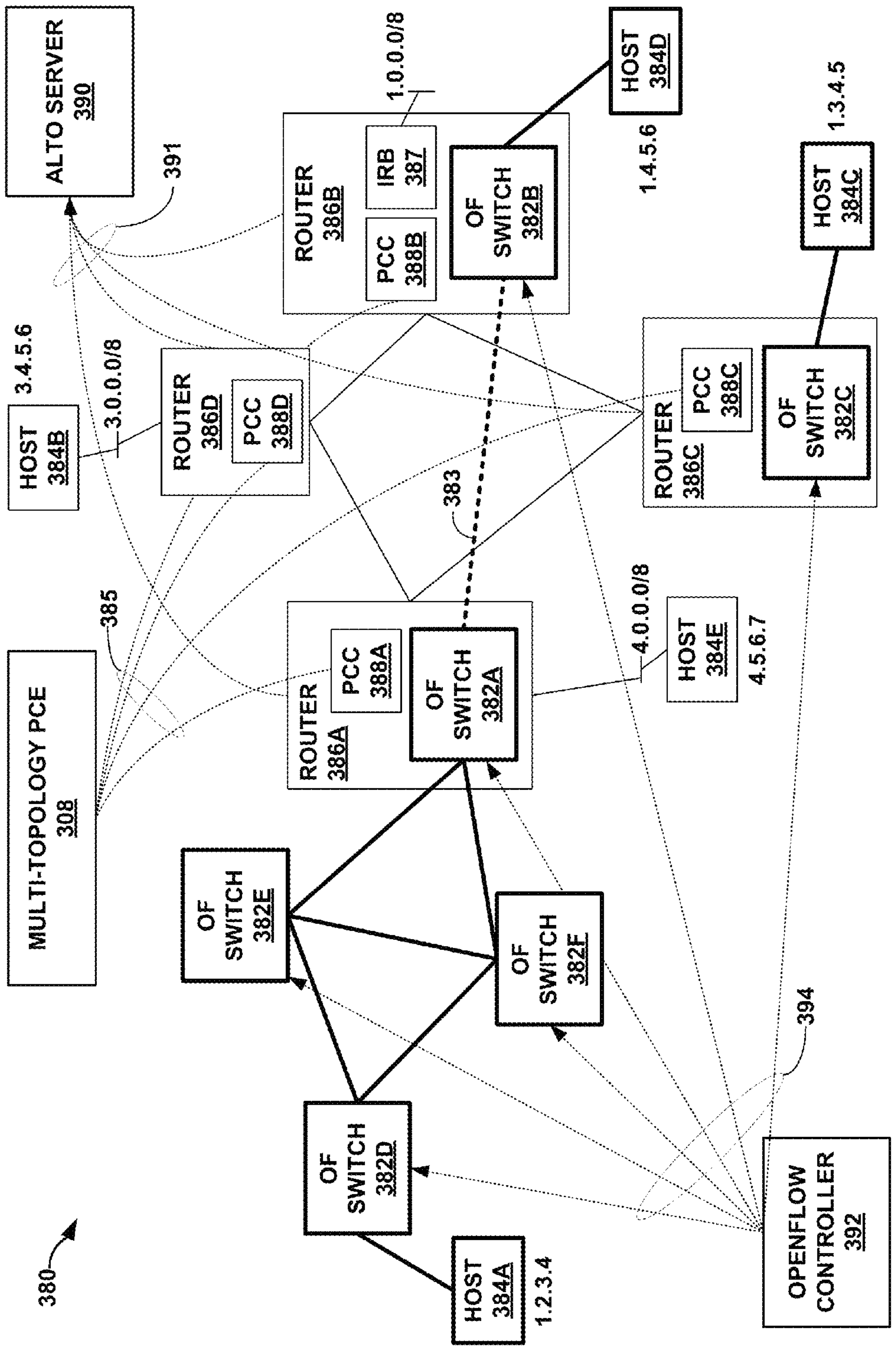
FIG. 7 is a block diagram of an example multi-topology network in which a multi-topology path computation element programs requested paths according to techniques of this disclosure.

FIG. 7 is a block diagram of an example multi-topology network in which a multi-topology path computation element programs requested paths according to techniques of this disclosure. Multi-topology network 380 may represent an example of network 10 of FIG. 1.

A base network layer of multi-topology network 380 includes routers 386A-386D (collectively, "routers 386") connected in the illustrated topology by network links. Base network layer routers 386 and interconnecting network links are illustrated in FIG. 7 with a thin line weight in comparison to nodes and interconnecting communication links of the overlay network layer of multi-topology network 380. Each of routers 386 may represent an example of any of EPs 32, 38, AXs 28, 36, AGs 19, or ERs 30 of FIG. 1, or network switches 306A-306B of FIG. 5. Routers 386 execute routing protocols to exchange routes that specify reachability to network subnets that each includes one or more of hosts 384A-384E (collectively, "hosts 384"). Each of hosts 384 may represent an example of any of hosts 13 of FIG. 1. For example, router 386D provides reachability to the 3.0.0.0/8 network subnet, which includes host 384B (having network address 3.4.5.6). As another example, router 386B provides reachability to the 1.0.0.0/8 network subnet, which includes hosts 384A, 384C, and 384D. Routers 386 also exchange topology information by which the routers may determine paths through the base network layer to a router that provides reachability for the network subnets. Network subnets include prefixes that conform to a network addressing scheme of the base network layer. The network addressing scheme in the illustrated example is IPv4. In some examples, the network addressing scheme is IPv6 or another network addressing scheme.

Each of routers 386 may be geographically distributed over a wide area. The base network layer of multi-topology network 380 may include multiple autonomous systems that transport traffic between hosts 384 to migrate data among distributed applications executing on hosts 384, for example.

Path computation clients (PCCs) 388A-388D (collectively, "PCCs 388") of respective routers 386 provide path status information for paths established through the base network of multi-topology network 380 to PCE 308 in respective PCE protocol (PCEP) sessions 385. Path status information may include descriptors for existing, operational paths as well as indications that an established path or path setup operation has failed. For example, PCE 308 may direct router 386A to establish an LSP over a computed path. Router 386A may attempt to signal the LSP using a reservation protocol such as RSVP-TE but fail due to insufficient network resources along a path specified by an Explicit Route Object (ERO). As a result, router 386A may provide an indication that the path setup operation failed to PCE 308 in a PCEP session 385.

PCE 308 may be a stateful PCE that maintains synchronization not only between PCE 308 and multi-topology network 380 base network layer topology and resource information as provided by PCCs 388, but also between PCE 306 and the set of computed paths and reserved resources in use in the network, as provided by PCCs 388 in the form of LSP state information. PCCs 388 may send path setup failure and path failure event messages using LSP state report messages in extended PCEP sessions to provide LSP state information for LSPs configured in any of routers 386. Extensions to PCEP that include LSP state report messages are described more fully in J. Medved et al., U.S. patent application Ser. No. 13/324,861, "PATH COMPUTATION ELEMENT COMMUNICATION PROTOCOL (PCEP) EXTENSIONS FOR STATEFUL LABEL SWITCHED PATH MANAGEMENT," filed Dec. 13, 2011, which is incorporated herein by reference in its entirety.

PCE 308 receives path status information and adds established paths through the base network layer of multi-topology network 380 as links in an overlay network topology stored by PCE 308. The overlay network topology may be stored in an example of MT TED 354 of FIG. 6. Tunnel 383, in this example, may be an instance of an established path computed by PCE 308 and signaled by router 386A to reach router 386B. Tunnel 383 may be a bi-directional tunnel. Tunnel 383 may thereafter be used to exchange L2 traffic between OpenFlow switch 382A and 382B. As a result, tunnel 383 is a link in the overlay topology network and is represented as such in the overlay network topology stored by PCE 308.

Extended PCEP sessions 385 also allow PCE 308 to actively update LSP parameters in PCCs 388 that have delegated control to PCE 308 over one or more LSPs headed by corresponding routers 386. The delegation and control techniques may, for example, allow PCE 308 to trigger LSP re-route, by an LSP head-end router such as any of routers 386, in order to improve LSP placement. In addition, LSP state injection using extended PCEP sessions 385 may further enable to PCE 308 to modify parameters of TE LSPs, including bandwidth and state, to synchronously coordinate demand placement, thereby permitting ordered control of path reservations across network routers.

PCE 308 may also configure new LSPs by configuring any of routers 386 to include new LSP interfaces. For example, PCE 308 may use an example of client interface 206 of FIG. 3 to configure router 386A to include an LSP represented by tunnel 383. PCE 308 may then use a PCEP session 385 with PCC 388A to direct router 386A to signal the LSP toward router 386B. In this way, PCE 308 may program tunnels for the overlay network layer of multi-topology network 380 between any of routers 386.

The service provider or other administrator for network 380 deploys Application-Layer Traffic Optimization (ALTO) server 390 to provide an application-layer traffic optimization service over network 380. The application-layer traffic optimization service may in some instances conform to the ALTO protocol. In general, the ALTO service enables service and/or content providers to influence the node selection process by applications to further service provider objectives, which may include improving path computation by reducing transmission costs along network layer topology links to the provider, load balancing, service-level discrimination, accounting for bandwidth constraints, decreasing round-trip delay between hosts 384 or between routers 386, and other objectives. The ALTO service and ALTO protocol is described in further detail in J. Seedorf et al., RFC 5693, "Application-Layer Traffic Optimization (ALTO) Problem Statement," Network Working Group, the Internet Engineering Task Force draft, October 2009; and R. Alimi et al., "ALTO Protocol: draft-ietf-alto-protocol-06.txt," ALTO Working Group, the Internet Engineering Task Force draft, October 2010, each of which is incorporated herein by reference in its entirety. Furthermore, while generally described with respect to the ALTO service and ALTO servers as described in Seedorf et al., the techniques of this disclosure are applicable to any form of application-layer traffic optimization.

ALTO server 390 establishes respective peering sessions 391 with routers 386A, 386B, and 386D that are edge routers of the base network layer of multi-topology network 380. Each of peering sessions 391 may comprise an Interior Border Gateway Protocol (IBGP) session or an exterior Border Gateway Protocol (BGP) session, for instance. In this way, ALTO Server 390 receives, in peering sessions 391, topology information for the base network layer originated or forwarded by routing protocol speakers of multi-topology network 380. The received topology information describes the topology of the routers 386 base network layer of network 380 and reachability of network address prefixes by any of routers 386. Peering sessions 391 may comprise Transmission Control Protocol (TCP) sessions between ALTO server 390 and routers 386A, 386B, and 386D. In some instances, ALTO server 390 may establish a single peering session with a route reflector (not shown) that "reflects" topology information to ALTO server 390 that is received by the route reflector from routers 386.

Peering sessions 391 may also, or alternatively, include interior gateway protocol (IGP) sessions between ALTO server 390 and routers 386. ALTO server 390 may operate as a passive IGP listener by peering with routers 386 in peering sessions 391. That is, ALTO server 390 receives routing information from routers 386 in peering sessions 391 but does not originate or forward routing information, for ALTO server 390 does not route packets (in its capacity as an ALTO server). Peering sessions 391 may represent, for example, an OSPF or IS-IS neighbor relationship (or "adjacency") or may simply represent movement of current routing information from routers 386 to ALTO server 390. In some instances, peering sessions 391 include traffic engineering extensions (e.g., OSPF-TE or IS-IS-TE) and routers 386 provide traffic engineering information to ALTO server 390.

ALTO server 390 generates one or more network maps and cost maps for multi-topology network 380 using topology information received in peering sessions 391 and provides these maps to ALTO clients, such as PCE 308. A network map contains network location identifiers, or PIDs, that each represents one or more network devices in a network. In general, a PID may represent a single device or device component, a collection of devices such as a network subnet, or some other grouping. A cost map contains cost entries for pairs of PIDs represented in the network map and an associated value that represents a cost to traverse a network path between the members of the PID pair. The value can be ordinal (i.e., ranked) or numerical (e.g., actual). ALTO server 390 provides the network maps and cost maps to PCE 308, which uses the network maps and cost maps to compute paths through multi-topology network 380.

In this example, ALTO server 390 generates at least two views of multi-topology network 380, in the form of network maps and corresponding cost maps, in accordance with techniques of this disclosure: a first view that constitutes an endpoint database for a base network layer (e.g., an example of endpoint databases 370 of FIG. 6) and a second view for the base network layer that describes an L3 traffic engineering database at link-level granularity, where link-level refers to the level of individual interfaces of routers 386. The second view, in other words, provides traffic engineering information for links connecting pairs of interfaces on respective routers 386. FIG. 5 provides an example of the first view generated by ALTO server 390, while FIG. 7 provides an example of the second view.

Further details regarding generating network and cost maps for a network are found in Penno et al., U.S. patent application Ser. No. 12/861,645, entitled "APPLICATION-LAYER TRAFFIC OPTIMIZATION SERVICE SPANNING MULTIPLE NETWORKS," filed Aug. 23, 2010, the entire contents of which are incorporated herein by reference. Additional details regarding ALTO map updates are found in Raghunath et al., U.S. patent application Ser. No. 12/861,681, entitled "APPLICATION-LAYER TRAFFIC OPTIMIZATION SERVICE MAP UPDATES," filed Aug. 23, 2010, the entire contents of which are incorporated herein by reference.

ALTO server 390 may comprise, for example, a high-end server or other service device or a service card or programmable interface card (PIC) insertable into a network device, such as a router or switch. ALTO server 390 may operate as an element of a service plane of a router to provide ALTO services in accordance with the techniques of this disclosure. In some instances, ALTO server 390 is incorporated into PCE 308. ALTO server 390 may represent an example embodiment of topology server 304 of FIG. 5. Additional details regarding providing ALTO services as an element of a service plane of a router are found in Raghunath et al., incorporated above.

Multi-topology network 380 also includes overlay network layer of interconnected OpenFlow (OF) switches 382A-382F (collectively, "OpenFlow switches 382") controlled by OpenFlow controller 392. While the overlay network layer is an L2 network in this example, the overlay network layer may be an L3 network in some instances. Each of OpenFlow switches 382 performs packet lookups and forwarding according to one or more flow tables each having one or more flow entries. Each flow entry specifies one or more match fields and a set of instructions to apply to packets the match values of the match fields. A match field may match any of the PDU parameters described above with respect to FIG. 5 (e.g., source and destination MAC and IP addresses). The set of instructions associated with each flow entry describe PDU forwarding and PDU modifications for PDU flows. For example, a set of instructions may direct one of OpenFlow switches 382 to decrement a time-to-live (TTL) value for PDUs in matching flows and then output the PDUs to a particular outbound interface of the OpenFlow switch. Additional details regarding OpenFlow are found in "OpenFlow Switch Specification version 1.1.0", OpenFlow Consortium, February 2011, which is incorporated by reference herein. While not illustrated as such to simply the figure, PCE 308 may couple to ALTO server 390 and OpenFlow controller 392 to exchange data and control messages using communication links.

OpenFlow switches 382D-382F represent dedicated OpenFlow switches that may each be a standalone device in the form of a router, L3, L2, or L2/L3 switch, or another network device that switches traffic according to forwarding information. As dedicated OpenFlow switches, OpenFlow switches 382D-382F do not in this example share a chassis or other hardware resources with a base network layer device (e.g., any of routers 386). Routers 386A-386C implement corresponding OpenFlow switches 382A-382C to direct traffic on respective subsets of physical or virtual interfaces of the routers. For example, router 386A may implement OpenFlow switch 382A to control a VPLS instance that switches L2 traffic among a set of interfaces that includes interfaces to OpenFlow switches 382B (i.e., a virtual interface for tunnel 383), 382E, and 382F. In this way, OpenFlow switches 382A-382C share hardware resources with corresponding routers 386A-386C.

The overlay network layer includes tunnel 383 connecting OpenFlow switches 382A, 382B. Tunnel 383 is a service link that transports L2 communications between routers 386A, 386B. Tunnel 383 is illustrated in FIG. 7 as a dashed line to reflect that tunnel 383 may not directly couple routers 386A, 386B to one another, but may be transported over one or more physical links and intermediate network devices that form tunnel 383. Tunnel 383 may be implemented as a pseudowire operating over a TE LSP or GRE tunnel, for example. Pseudowire service emulation is described in additional detail in "Pseudo Wire Emulation Edge-to-Edge (PWE3) Architecture," Request for Comments: 3985, Network Working Group (Bryant and Pate, ed.), March, 2005, which is incorporated by reference as if fully set forth herein.

Router 386B includes an integrated routing and bridging (IRB) interface 387 that is a gateway between the overlay network layer and the base network layer of multi-topology network 380. IRB interface 387 connects the bridge domain that is the L2 overlay network layer of multi-topology network 380 to a routed domain that is the base network layer. IRB interface 387 thus includes both a bridging instance that includes L2 learning tables as well as a routing instance mapped to the bridging instance. The bridging instance may include OpenFlow switch 382B operating over a VPLS or other L2 instance. IRB interface 387 therefore acts as a L3 routing interface for a bridge domain in which OpenFlow switch 382B participates. In this way, IRB interface 387 provides simultaneous support for L2 bridging and L3 routing and can function as a gateway between the layers of multi-topology network 380.

The bridge domain in this example includes subnet 1.0.0.0/8, for which router 386B advertises itself to other routers 386 as providing reachability to. Elements of the overlay network (e.g., hosts 384A, 384C, and 384D) may identify routable L3 traffic by addressing the L3 traffic to a gateway L2 address (e.g., a gateway MAC address) known to IRB interface 387. The gateway L2 address may be a MAC address of router 386B, a MAC address of an interface of router 386B that couples to an overlay network link, or any other L2 address that IRB interface 387 may use to classify PDUs arriving on an L2 interface of router 386B as L3 traffic.

OpenFlow controller 392 establishes OpenFlow protocol sessions 394 with each of OpenFlow switches 382 to configure the flow tables therein and to receive copies of PDUs sent to OpenFlow controller 392 by OpenFlow switches 382. OpenFlow switches 382 also send OpenFlow controller 392 identifiers for the respective physical and virtual (if any) ports on which PDUs are received. A port on which a PDU is received is also referred to as an "in port." OpenFlow controller 392 analyzes the received PDUs and associated in ports to determine an overlay network layer topology for multi-topology network 380. In this example, in other words, OpenFlow controller 392 performs L2 topology discovery. For example, OpenFlow controller 392 may receive a message in an OpenFlow protocol session 394 from OpenFlow switch 382F that includes a copy of a PDU received by OpenFlow switch 382F at port P1. The PDU specifies a destination MAC address D. OpenFlow controller 392 may have previously configured OpenFlow switch 382D to output PDUs having destination MAC address D to port P2 of OpenFlow switch 382D. OpenFlow controller 392 may use this information to determine that a L2 link is present in the overlay network layer between OpenFlow switch 382D and 382F. OpenFlow controller 392 provides the discovered L2 topology to PCE 308, which stores the L2 topology to a multi-topology database, which may be an example of MT TED 354 of FIG. 6. OpenFlow controller 392 may represent an example of overlay controller 314 of FIG. 5. In some examples, OpenFlow controller 392 is incorporated within PCE 308.

PCE 308 presents an interface by which clients may request, for a specified time, a dedicated path between any combination of hosts 384. PCE 308 uses base network topology information for multi-topology network 380 received from ALTO server 390, overlay network topology information for multi-topology network 380 received from OpenFlow controller 392, and path status information received from PCCs 388 to compute and schedule paths between hosts 384 through multi-topology network 380 that satisfy the parameters for the paths requested by the clients. PCE 308 may receive multiple path requests from clients that overlap in time. PCE 308 reconciles these requests by scheduling corresponding paths for the path requests that traverse different parts of multi-topology network 380 and increase capacity utilization, for example, or by denying some of the path requests.

At the scheduled time for a scheduled path, PCE 308 installs forwarding information to multi-topology network 380 nodes (e.g., OpenFlow switches 382 and routers 386) to cause the nodes to forward traffic in a manner that satisfies the requested path parameters. A requested path may traverse either or both domains of multi-topology network 380. That is, a requested path may traverse either or both of the base network layer and overlay network layer of multi-topology network 380. PCE 308 installs forwarding information to OpenFlow switches 382 using OpenFlow controller 392. OpenFlow controller 392 presents a programming interface by which PCE 308 may configure flow tables of OpenFlow switches 382 using OpenFlow protocol sessions 394. PCE 308 invokes the programming interface of OpenFlow controller 392 by sending overlay network path setup messages (not shown in FIG. 7) directing OpenFlow controller 392 to establish paths in the overlay network layer of multi-topology network 380 and/or steer flows from hosts 384 onto established paths. OpenFlow controller 392 responds to overlay network path setup messages by installing forwarding information to OpenFlow switches 382 that implements the paths and/or directs flows received from hosts 384 onto established paths.

PCE 308 installs forwarding information to routers 386 using PCEP sessions 385 with PCCs 388 and, in some instances, using network management interfaces to router routers 386. PCE 308 may invoke the network management interfaces of routers 386 to configure a tunnel (e.g., an LSP), install static routes, configure a VPLS instance, configure IRB interface 387, and to otherwise configure routers 386 to forward packet flows in a specified manner. PCE 308 also communicates with PCCs 388 to direct routers 386 to signal LSPs through the base network layer of multi-topology network 380 to establish paths that may be used by the overlay network to transport L2 traffic along scheduled paths.

In this way, the described techniques use network application programming interfaces (APIs), i.e., PCEP and OpenFlow, to obtain topology information for multiple layers of multi-topology network 380 and also to program ephemeral forwarding information into the multiple layers. Obtaining topology information for multiple layers allows PCE 308 to have access to a full multi-topology and utilization of the network for path computation. As a result, the techniques may improve network utilization by steering traffic to underutilized portions of multi-topology network 380. In addition, the techniques may avoid programming forwarding information into nodes of multi-topology network 380 using configuration methods, which may require commits involving significant overhead.

Figure 8:
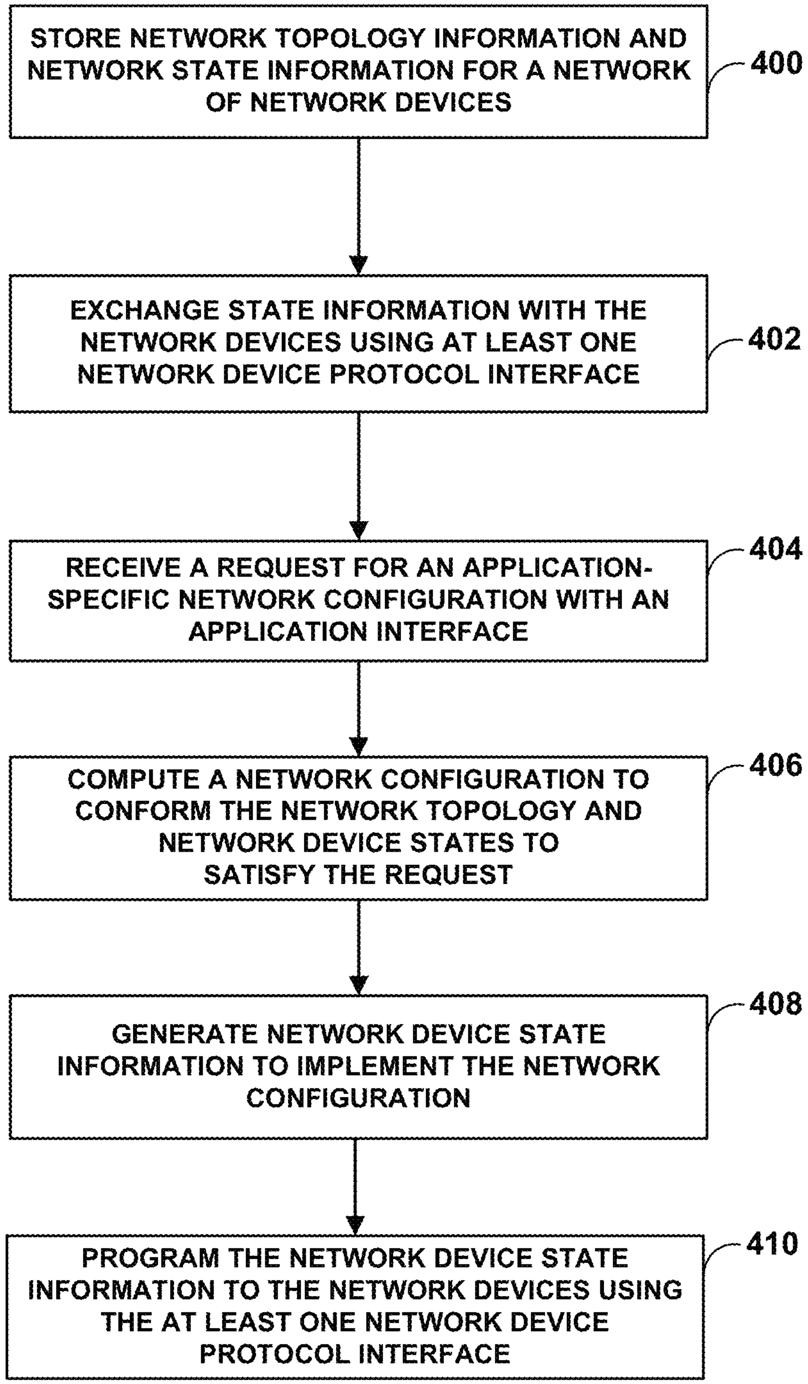
FIG. 8 is a flowchart illustrating an example mode of operation of a software-defined networking controller to receive a request from a user application and automatically configure devices in a network based on the request.

FIG. 8 is a flowchart illustrating an example mode of operation of a software-defined networking controller to receive a request from a user application and automatically configure devices in a network based on the request. The controller is described with respect to controller 35 of FIG. 1, but may represent an example of any of the aforementioned examples of controllers in this disclosure. Controller 35 stores, by one or more databases, network topology information and network state information for the network devices (400). Controller 35 exchanges, with the network devices and by one or more network device protocol interfaces, state information comprising at least one of network topology information and network device state information (402). Controller 35 receives, by one or more application interfaces and from an application, a request for an application-specific network configuration (404). In response to the request, controller 35 computes, by one or more core modules, a network configuration to conform the network topology and network device states to satisfy the request (406). Controller 35 generates, by one or more core applications of the controller, network device state information to implement the computed network configuration (408). Controller 35 then uses the network device protocol interfaces to program the network device state information to the network devices to program the network configuration in the network (410).

In some examples, a method includes storing, by one or more databases of a controller that manages a network of one or more network devices, network topology information and network state information for the network devices. The method also includes exchanging, with at least one of the network devices and by one or more network device protocol interfaces of the controller, state information comprising at least one of network topology information and network device state information. The method also comprises receiving, by one or more application interfaces of the controller and from applications, requests for application-specific network configurations. The method also includes computing, by one or more core modules of the controller, respective network configurations to conform the network topology and network device states to satisfy the requests. The method also includes generating, by one or more core applications of the controller, network device state information to implement computed network configurations and to use the network device protocol interfaces to program the network device state information to the network devices to program the network configuration in the network.

In these and other examples, the application interfaces may include at least one of a video-on-demand service interface, a connectivity-on-demand service interface, a firewall-in-cloud service interface, and a data replication service interface. In these and other examples, the core modules may include at least one of a path computation engine, a path computation element protocol (PCEP) server, a software-defined networking controller, and an OpenFlow controller.

In these and other examples, the network device protocol interfaces may include at least one of a path computation element protocol (PCEP) interface, a software-defined networking protocol interface, an OpenFlow protocol interface, an application-layer traffic optimization protocol interface, a Border Gateway Protocol interface, a firewall rule installation protocol interface, a charging rule installation protocol interface, and a policy rule installation protocol interface.

In these and other examples, the one or more databases comprise at least one of a traffic engineering database, a multi-topology traffic engineering database, an application-layer traffic optimization (ALTO) map, and a routing information base. In these and other examples, the network device protocol interfaces, application interfaces, core modules, and core applications provide may open interfaces to enable a modular plugin architecture for adding or replacing any of the network device protocol interfaces, application interfaces, core modules, and core applications. In these and other examples, any of the network device protocol interfaces, application interfaces, core modules, and core applications added or replaced may serve a special-purpose application or network orchestration function.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium or computer-readable storage device may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Various embodiments have been described. These and other embodiments are within the scope of the following examples.

What is claimed is:

1. A software-defined network (SDN) controller that manages a network of one or more network devices, the SDN controller comprising:

a memory;

one or more processors in communication with the memory;

one or more databases configured to store network topology information and network state information for the network devices;

a plurality of network device protocol interfaces comprising a path computation element protocol (PCEP) adapter and a software-defined networking protocol adapter, wherein each of the network device protocol interfaces is configured to exchange state information with at least one of the network devices, wherein the state information comprises at least one of network topology information and network device state information;

one or more application interfaces configured to receive, from applications, requests for application-specific network configurations;

a plurality of core modules operable by the one or more processors and configured to receive the requests for application-specific network configurations from the one or more application interfaces, and compute respective network configurations to conform the network topology and network device states to satisfy the requests, wherein the plurality of core modules comprises a path computation engine to compute a path for the network topology and a software-defined networking controller core module; and one or more core applications operable by the one or more processors and configured to receive the respective network configurations from the plurality of core modules, generate network device state information to implement the computed network configurations, and use respective ones of the plurality of network device protocol interfaces to program the network device state information to the network devices to program the network configurations in the network, wherein the one or more core applications comprise a path provisioning module, wherein the path provisioning module controls the PCEP adapter to provide an indication of the path to a head-end network device of the path, and wherein one or more of the core applications uses the software-defined networking protocol adapter to map a data stream to the path.

2. The SDN controller of claim 1, further comprising:

one or more applications configured to use the application interfaces to orchestrate the core modules to compute respective network configurations to satisfy a plurality of the requests for a corresponding plurality of concurrent application-specific network configurations.

3. The SDN controller of claim 2, wherein one of the applications comprises a connectivity on-demand application configured to use the application interfaces to orchestrate the core modules to compute a network configuration for a request for an application-specific network configuration that connects a plurality of endpoints reachable by the network.

4. The SDN controller of claim 2, wherein one of the applications comprises a firewall-in-cloud application configured to use the application interfaces to orchestrate the core modules to compute a network configuration for a request for an application-specific network configuration that includes firewall rules for the network devices.

5. The SDN controller of claim 1, wherein the application interfaces comprise at least one of a video-on-demand service interface, a connectivity-on-demand service interface, a firewall-in-cloud service interface, and a data replication service interface.

6. The SDN controller of claim 5, wherein the video-on-demand service interface receives a request from a video service application for streaming video for a user device, wherein the video-on-demand service interface uses one of the application interfaces to query the databases to determine an endpoint that serves the streaming video, wherein the video-on-demand service interface uses the connectivity-on-demand service interface to install a connection between the user device and the endpoint.

7. The SDN controller of claim 1, wherein the software-defined networking controller core module comprises an OpenFlow controller core module.

8. The SDN controller of claim 1, wherein the network device protocol interfaces further comprise at least one of an application-layer traffic optimization protocol interface, a Border Gateway Protocol interface, a firewall rule installation protocol interface, a charging rule installation protocol interface, and a policy rule installation protocol interface.

9. The SDN controller of claim 1, wherein the one or more databases comprise at least one of a traffic engineering database, a multi-topology traffic engineering database, an application-layer traffic optimization (ALTO) map, and a routing information base.

10. The SDN controller of claim 1, wherein the network device protocol interfaces, application interfaces, core modules, and core applications provide open interfaces to enable a modular plugin architecture for adding or replacing any of the network device protocol interfaces, application interfaces, core modules, and core applications.

11. The SDN controller of claim 10, wherein any of the network device protocol interfaces, application interfaces, core modules, and core applications added or replaced serve a special-purpose application or network orchestration function.

12. The SDN controller of claim 1, wherein the controller comprises a first controller, wherein a first one of the network device protocol interfaces is configured to exchange state information with a second controller that manages an additional network device, and wherein the first controller uses the first one of the network device protocol interfaces to communicate with the second controller to manage the additional network device.

13. The SDN controller of claim 1, wherein the controller comprises a first controller, wherein a first one of the application interfaces is configured to exchange state information with a second controller that manages an additional network device, and wherein the first controller uses the first one of the application interfaces to communicate with the second controller to manage the additional network device.

14. The SDN controller of claim 1, wherein the one or more databases comprise a multi-topology traffic engineering database to store topology information for a base network layer of a multi-topology network that comprises a plurality of network switches interconnected by base network layer three (L3) links in a base network topology and to store topology information for an overlay network layer of the multi-topology network that comprises a plurality of overlay switches interconnected by overlay network links in an overlay network topology, wherein each of the overlay network links represents a path through the base network connecting two of the overlay switches, wherein the one or more network device protocol interfaces comprise a topology server interface to receive topology information for the base network layer, and an overlay controller interface to receive topology information for the overlay network layer, wherein the one or more core modules comprise a service path engine to compute a path to carry traffic between two endpoints through one or more layers of the multi-topology network based on the requests for application-specific network configurations using the topology information for the base network layer and the topology information for the overlay network layer, and wherein the path provisioning module installs forwarding information for the path to one or more of the network switches and overlay switches.

15. The SDN controller of claim 14, wherein the service path engine, while attempting to compute the path, computes two disjoint subgraphs of the overlay network layer that are unconnected by an overlay link, wherein a first one of the endpoints is reachable by a first one of the two disjoint subgraphs and a second one of the endpoints is reachable by a second one of the two disjoint subgraphs, wherein the service path engine computes a base network layer path through the base network layer that connects the two disjoint subgraphs, wherein the path provisioning module controls the PCEP adapter to establish a tunnel connecting the two disjoint subgraphs and store a new overlay network link for the tunnel to the topology information for the overlay network layer in the multi-topology traffic engineering database, wherein the service path engine computes the requested path to include the new overlay network link; and wherein the software-defined networking protocol adapter comprises an OpenFlow adapter, wherein the path provisioning module controls the OpenFlow adapter to program the network device state information for the tunnel to overlay switches in the overlay network layer based on the new overlay network link stored by the PCEP adapter.

16. The SDN controller of claim 15, wherein the PCEP adapter establishes the tunnel by establishing the tunnel between a first one of the overlay switches that is logically located in a first one of the two disjoint subgraphs and a second one of the overlay switches that is logically located in a second one of the two disjoint subgraphs.

17. A method comprising:

storing, by one or more databases of a software-defined network (SDN) controller that manages a network of one or more network devices, network topology information and network state information for the network devices;

exchanging, with at least one of the network devices and by a plurality of network device protocol interfaces of the SDN controller, state information comprising at least one of network topology information and network device state information, the plurality of network device protocol interfaces comprising a path computation element protocol (PCEP) adapter and a software-defined networking protocol adapter;

receiving, by one or more application interfaces of the SDN controller and from applications, requests for application-specific network configurations;

providing the requests for application-specific network configurations from the one or more application interfaces to a plurality of core modules of the SDN controller, wherein the plurality of core modules comprises a path computation engine to compute a path for the network topology and a software-defined networking controller core module;

computing, by the plurality of core modules of the SDN controller, respective network configurations to conform the network topology and network device states to satisfy the requests;

providing, by the plurality of core modules of the SDN controller, the computed network configurations to one or more core applications of the SDN controller; and generating, by one or more core applications of the SDN controller, network device state information to implement the computed network configurations and to use the network device protocol interfaces to program the respective ones of the plurality of network device state information to the network devices to program the network configurations in the network, wherein the one or more core applications comprise a path provisioning module, wherein the path provisioning module controls the PCEP adapter to provide an indication of the path to a head-end network device of the path, and wherein one or more of the core applications uses the software-defined networking protocol adapter to map a data stream to the path.

18. The method of claim 17, further comprising:

orchestrating, by one or more applications of the SDN controller that are configured to use the application interfaces, the core modules to compute respective network configurations to satisfy a plurality of the requests for a corresponding plurality of concurrent application-specific network configurations.

19. The method of claim 18, wherein one of the applications comprises a connectivity on-demand application, the method further comprising:

orchestrating, by the application interfaces, the core modules to compute a network configuration for a request for an application-specific network configuration that connects a plurality of endpoints reachable by the network.

20. The method of claim 18, wherein one of the applications comprises a firewall-in-cloud application, the method further comprising:

orchestrating, by the firewall-in-cloud application, the application interfaces to orchestrate the core modules to compute a network configuration for a request for an application-specific network configuration that includes firewall rules for the network devices.

21. The method of claim 17, wherein the application interfaces comprise at least one of a video-on-demand service interface, a connectivity-on-demand service interface, a firewall-in-cloud service interface, and a data replication service interface, further comprising:

receiving, by the video-on-demand service interface, a request from a video service application for streaming video for a user device; and using, by the video-on-demand service interface, one of the application interfaces to query the databases to determine an endpoint that serves the streaming video; and using, by the video-on-demand service interface, the connectivity-on-demand service interface to install a connection between the user device and the endpoint.

22. The method of claim 17, wherein the network device protocol interfaces, application interfaces, core modules, and core applications provide open interfaces to enable a modular plugin architecture for adding or replacing any of the network device protocol interfaces, application interfaces, core modules, and core applications.

23. The method of claim 17, wherein the SDN controller comprises a first SDN controller, the method further comprising:

exchanging, by a first one of the network device protocol interfaces, state information with a second SDN controller that manages an additional network device; and using, by the first SDN controller, the first one of the network device protocol interfaces to communicate with the second SDN controller to manage the additional network device.

24. The method of claim 17, wherein the controller comprises a first SDN controller, the method further comprising:

exchanging, by a first one of the application interfaces, state information with a second SDN controller that manages an additional network device; and using, by the first SDN controller, the first one of the application interfaces to communicate with the second SDN controller to manage the additional network device.

25. A computer-readable storage medium encoded with instructions that, when executed by at least one processor of a computing device, cause the at least one processor:

store, by a software-defined network (SDN) controller that manages a network of one or more network devices, network topology information and network state information for the network devices;

exchange, with at least one of the network devices and by a plurality of network device protocol interfaces of the SDN controller, state information comprising at least one of network topology information and network device state information, the plurality of network device protocol interfaces comprising a path computation element protocol (PCEP) adapter and a software-defined networking protocol adapter;

receive requests, by one or more application interfaces of the SDN controller and from applications, for application-specific network configurations;

provide the requests for application-specific network configurations from the one or more application interfaces to a plurality of core modules of the SDN controller;

compute, by the plurality of core modules, network configurations to conform the network topology and network device states to satisfy the requests, wherein the plurality of core modules comprises a path computation engine to compute a path for the network topology and a software-defined networking controller core module;

provide the computed network configurations, by the plurality of core modules of the SDN controller, to one or more core applications; and generate, by the one or more core applications of the SDN controller, network device state information to implement the computed network configurations and to use respective ones of the plurality of the network device protocol interfaces to program the network device state information to the network devices to program the network configurations in the network, wherein the one or more core applications comprise a path provisioning module, wherein the path provisioning module controls the PCEP adapter to provide an indication of the path to a head-end network device of the path, and wherein one or more of the core applications uses the software-defined networking protocol adapter to map a data stream to the path.

* * * * *